United States Patent
Kobayashi

(10) Patent No.: US 7,021,791 B1
(45) Date of Patent: Apr. 4, 2006

(54) VEHICULAR HEADLAMP APPARATUS

(75) Inventor: Shoji Kobayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/535,939

(22) Filed: Mar. 24, 2000

(30) Foreign Application Priority Data

Mar. 26, 1999  (JP)  ............................ 11-084331
Oct. 28, 1999  (JP)  ............................ 11-306975

(51) Int. Cl.
    *B60Q 1/04* (2006.01)
(52) U.S. Cl. .................. 362/212; 362/214; 362/465
(58) Field of Classification Search ............... 362/212, 362/214, 464, 465, 508, 510, 512, 539, 282, 362/284, 322, 324
See application file for complete search history.

(56) References Cited

U.S. PATENT DOCUMENTS

| 3,569,693 A | * | 3/1971 | Lindae et al. ............... 362/215 |
| 4,645,975 A | | 2/1987 | Meitzler et al. |
| 5,086,253 A | | 2/1992 | Lawler |
| 5,130,903 A | * | 7/1992 | Fast et al. .................. 362/284 |
| 5,190,368 A | | 3/1993 | Sekiguchi |
| 5,264,993 A | | 11/1993 | Neumann et al. |
| 5,436,807 A | | 7/1995 | Kobayashi |
| 5,537,003 A | | 7/1996 | Bechtel et al. |
| 5,645,338 A | | 7/1997 | Kobayashi |
| 5,707,129 A | | 1/1998 | Kobayashi |
| 5,837,994 A | | 11/1998 | Stam et al. |
| 5,954,428 A | * | 9/1999 | Eichhorn et al. ........... 362/465 |
| 5,988,837 A | * | 11/1999 | Eichhorn et al. ........... 362/464 |
| 6,059,435 A | * | 5/2000 | Hamm et al. ............... 362/512 |

FOREIGN PATENT DOCUMENTS

| DE | 19603529 A1 | 8/1997 |
| DE | 19632190 A1 | 2/1998 |
| DE | 19639526 A1 | 4/1998 |
| EP | 0 794 382 A2 | 9/1997 |
| GB | 2 266 947 A | 11/1993 |
| GB | 2 275 764 A | 9/1994 |
| GB | 2 308 649 A | 7/1997 |
| GB | 2 315 538 A | 2/1998 |
| GB | 2 337 322 A | 11/1999 |
| GB | 2 337 809 A | 12/1999 |

* cited by examiner

*Primary Examiner*—Y. My Quach-Lee
(74) *Attorney, Agent, or Firm*—Fish & Richardson P.C.

(57) ABSTRACT

A vehicular headlamp apparatus 1 is provided with a first and a second light-emitting portion including a common light source 3 or a plurality of light sources 3 and 3'. The first light-emitting portion 2_1 forms a base beam by normally lighting the light source 3 to use emission light from the light source. The second light-emitting portion 2_2 is caused to emit an auxiliary beam for supplementing the light distribution of the base beam made available by the first light-emitting portion 2_1. The distribution, the quantity of light or light color of the light emitted from the first light-emitting portion 2_1 is varied with the travel condition or travel environment of a vehicle.

7 Claims, 18 Drawing Sheets

VEHICULAR HEADLAMP APPARATUS

BACKGROUND OF THE INVENTION

1. Field of the Invention

This invention relates to a technology of implementing control of light distribution corresponding to the travel condition and travel environment of a vehicle.

2. Description of the Related Art

At the time of controlling light emission from vehicle lamps such as automotive lamps, switching between high and low beams is well known. The high beam is used for irradiating a remote forward field, whereas the low beam is used at the time of passing cars coming from the opposite direction. It is also well known to switch filaments within one light source or switch high- and low-beam lamps that are prepared beforehand.

In such a conventional vehicular headlamp apparatus, however, high-beam light distribution and low-beam light distribution are independently employed, each of which is exclusively selected. Consequently, it is likely to make difficult the provision of light distribution offering a satisfactory visual field angle, depending on the travel condition and travel environment of a vehicle.

SUMMARY OF THE INVENTION

An object of the present invention is to provide a vehicular headlamp apparatus capable of variably controlling light distribution, the quantity of light and light color according to the travel condition and travel environment of a vehicle.

In order to solve the foregoing problems according to the invention, a vehicular headlamp apparatus comprising a plurality of light-emitting portions including a common light source or a plurality of light sources is so arranged that:

(i) Of the plurality of light-emitting portions, a first light-emitting portion is used for forming a base beam by normally lighting the light source or a group of light sources so as to make the light source or the group of light sources emit light.

(ii) A second light-emitting portion different from the first light-emitting portion is provided so as to supplement the light distribution of the base beam by the light emitted from the second light-emitting portion.

(iii) The second light-emitting portion is such that the distribution of the light emitted therefrom, the quantity of light or light color is made variable with the travel condition or travel environment of a vehicle, whereby the light distribution of the beam thus emitted therefrom is variably controlled.

According to the invention, light distribution and an emission range that have not been satisfactorily secured so far are obtainable by only adding an auxiliary beam to the base beam using the light source that is normally lighted.

According to the invention, the high-beam light source or light-emitting portion that has not been used so far can be utilized by utilizing part of the high beam for use in irradiating the forward field of the vehicle in a wide range (i.e., the light source or light-emitting portion that has played its originally-intended role only at the time of emitting the high beam can be utilized as a means of contributing the light distribution by the formation of the auxiliary beam even at the time of emitting the low beam).

According to the invention, forward visual recognizability in bad weather such as rainy weather can be improved by using the beam formed by the second light-emitting portion for irradiating the center line of a roadway or the shoulder thereof.

According to the invention, the forward visual field can satisfactorily be secured in accordance with the travel speed and travel environment of the vehicle by the beam formed by the second light-emitting portion that emits to irradiate the field on and near the cutoff in the low beam light distribution.

According to the invention, as the beam formed by the second light-emitting portion is formed by making the peripheral zone of the reflective surface of the reflector, the beam may prevent the light distribution from being badly affected when the emission beam is formed by using the whole reflective surface of the reflector at the time of lighting the second light-emitting portion. This may facilitate the designing of the reflective surface.

According to the inventions, since the emitting range can easily be controlled only by switching the luminescent portions, the construction of the headlamp can be simplified and therefore the headlamp can be fabricated inexpensively.

According to the invention, shielding unnecessary light with the light shielding member can allow only light to be made use of which is needed for the remote side area irradiating beams or near side area irradiating beams.

According to the invention, the two filaments are used and they only have to be switched, and therefore, this not only simplifies the construction and control but also facilitates the designing of configurations and light distributions for reflectors.

BRIEF DESCRIPTION OF THE DRAWINGS

FIG. 21 is a schematic diagram showing light distribution patterns obtained when sub-filaments accompanied by the shield members of the first and second lamp portions are turned on.

FIG. 23 is a schematic diagram showing light distribution patterns obtained when the sub-filament of the first lamp portion and the main filament of the second lamp portion are turned on.

FIG. 28 is a schematic view showing a light distribution pattern resulting from the first lamp portion and a light distribution pattern obtained when the first filament of the second lamp portion is turned on.

DESCRIPTION OF THE PREFERRED EMBODIMENTS

Figure 1:
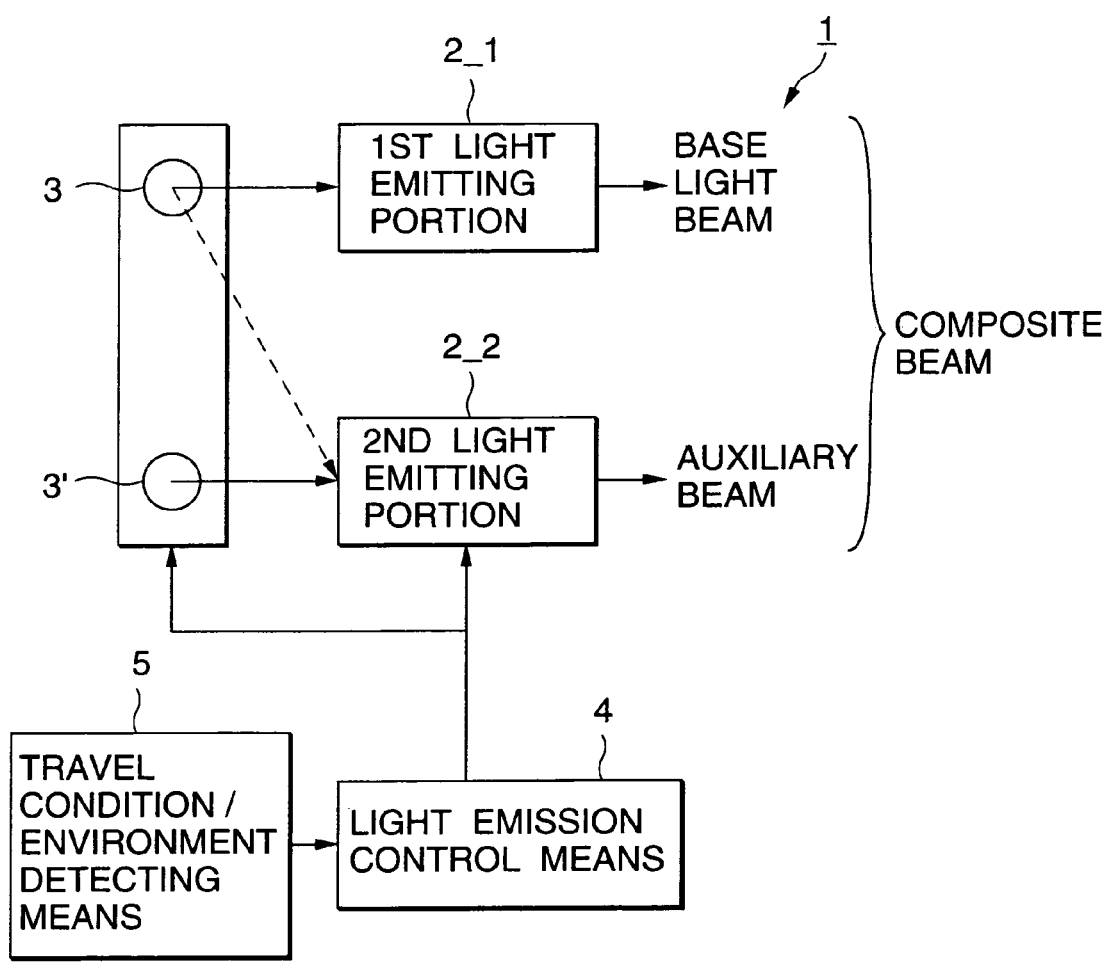
FIG. 1 is a basic arrangement according to the present invention.

FIG. 1 shows a basic arrangement according to the present invention, wherein a vehicular headlamp apparatus 1 includes a plurality of light-emitting portions, which employ a common light source or a plurality of light sources. In FIG. 1, there are shown a first light-emitting portion 2_1 and a second light-emitting portion 2_2 as the plurality of light-emitting portions. In this case, a common light source 3 may be employed between both the light-emitting portions or different light sources 3 and 3' may be employed for the respective light-emitting portions. In the former case, the light source 3, its reflector (or a reflector portion) and a lens (or a lens portion) disposed in front of the light source 3 and the reflector constitute each light-emitting portion, whereas, in the latter case, the light source 3, its reflector (or the reflector portion), the lens (or the lens portion) constitute the first light-emitting portion 2_1; and the light source 3', its reflector (or a reflector portion) and a lens (or a lens portion) constitute the second light-emitting portion 2_2.

Of the plurality of light-emitting portions, the first light-emitting portion 2_1 fills the role of forming a base beam with the light emitted from the relevant light source or a group of light sources by ordinarily lighting the light source or the group of light sources. Incidentally, though there are a fixed light distribution method and a variable light distribution method (allowing the light distribution to be freely controlled by a mechanism for variably controlling the light distribution) with respect the distribution of base light beams, the former is advantageous in view of simplifying the lamp construction and cost reduction.

The second light-emitting portion 2_2 performs the part of supplementing the base light beam distribution with an auxiliary beam emission therefrom; in the case of an automotive lamp, for example, part of a high beam by means of a headlamp or the beam emitted from an auxiliary headlamp such as a fog lamp may be utilized as an auxiliary beam (i.e., the auxiliary beam is made obtainable by effectively utilizing the second light-emitting portion 2_2 that has not been used so far at the time of emitting the base beam). Further, the distribution of the light emitted from the second light-emitting portion 2_2, or the quantity or color (e.g., white or yellow color) of the light emitted therefrom is so arranged as to be set variable with the travel condition or travel environmental condition of the vehicle, whereby the light distribution is variably controlled.

A light emission control means 4 is provided for the purpose and used for controlling the light distribution, the quantity of light, and the light color by sending control signal to the second light-emitting portion 2_2 according to information from a travel condition/travel environment detecting means 5.

The travel condition of the vehicle includes vehicle speed and the travel attitude of the vehicle that are obtained by a travel speed detecting means (e.g. a speed sensor) and a vehicle height detecting means that are mounted in the vehicle. Further, though the travel environment of the vehicle includes information on the configuration and structure of a road, weather information, and the presence and absence of a preceding or an oncoming car, the information on the configuration and the structure of the road is obtainable from the results of analyzing the image information caught by the front photographing camera attached to the vehicle or use can be made of a navigation (route guidance) system utilizing GPS (Global Positioning System) as a means for estimating the present and following directions in which the vehicle travels according to map information including the road configuration and information on the present position of the one's vehicle. Use can also be made of information available from road-to-vehicle communication (utilizing any facility connecting the vehicle and the road by radio). Moreover, the information on the preceding or oncoming vehicle may be detected by a sensor utilizing infrared rays or ultrasonic waves or otherwise by an illumination sensor for detecting the light emitted from the oncoming car.

As the method of controlling the light distribution by using the light emission control means 4, a method of controlling the attitude of an optical member constituting the light-emitting portion, for example, the reflector or part of the reflector (e.g., a movable reflector) and a method of controlling the position of an inner lens disposed in the lamp will be enumerated. However, a method of controlling the position of a shade (a light shielding member) covering the periphery of the light source is simpler.

Figure 2:
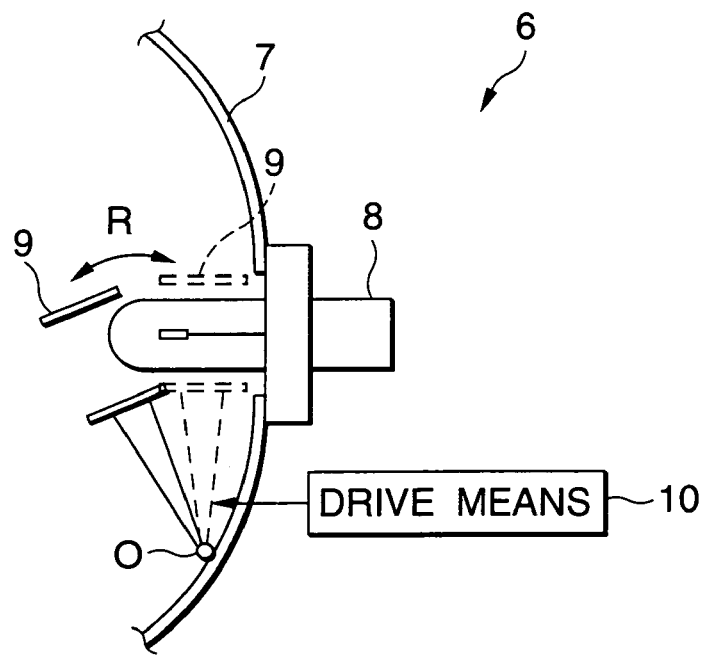
FIG. 2 is a schematic diagram of a mechanism, together with what is shown in FIG. 3, for variably controlling light distribution by pivoting a shade to be driven.
Figure 3:
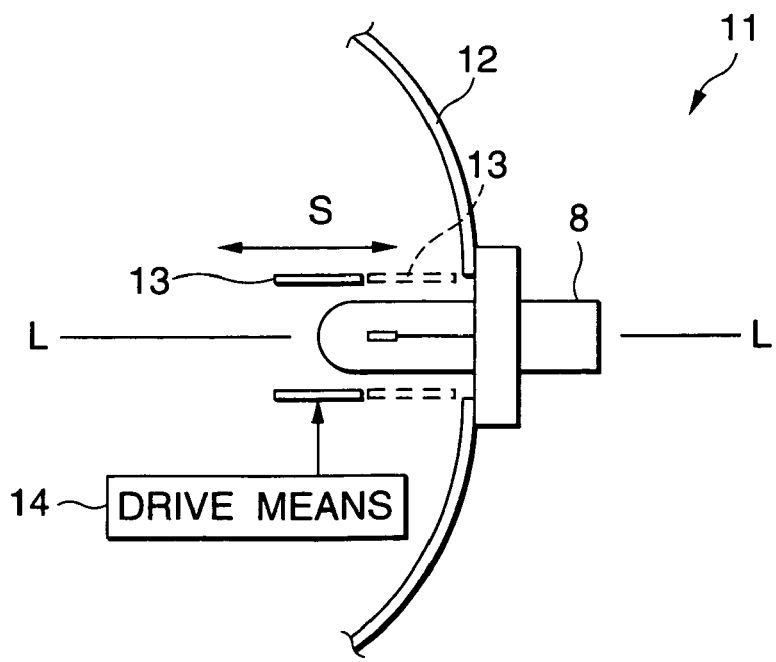
FIG. 3 is a schematic diagram of the mechanism for variably controlling the light 115 distribution by sliding the shade.

FIG. 2 is a schematic diagram of a mechanism 6 for variably controlling the light distribution by pivoting a shade. As shown in FIG. 3, a shade 9 covering a light source 8 fitted to a reflector 7 from the front side is pivotally supported around a pivotal fulcrum O so that the pivotal attitude of the shade can be defined by an actuator using a motor or a drive means such as a solenoid. In other words, as the shade 9 is tiltable continuously or stepwise along a direction of an arrow R in FIG. 2, part of the light directed from the reflector of the reflector 7 from the light source 8 is shielded in accordance with the attitude of the shade 9, whereby the light distribution can be defined by intentionally using only the reflected light in the desired zone of the reflector.

FIG. 3 is a schematic diagram of a mechanism 11 for variably controlling the light distribution by sliding the shade as an exemplary arrangement. As shown in FIG. 3, a shade 13 covering the light source 8 fitted to a reflector 12 from the front side is linearly movably supported along the optical axis 'L—L' of the reflector 12. With respect of the driving of the shade 13, the position in the longitudinal (optical axis) direction of the shade 13 is defined by the actuator using the motor or the drive means 14 such as a solenoid. Part of the light directed to the reflective surface of the reflector 12 from the light source 8 can be shielded in accordance with the position of the shade 13 by sliding the shade 13 continuously or stepwise along a direction in parallel to the optical axis L—L as shown by an arrow S, whereby the light distribution can be defined by intentionally using only the reflected light in the desired zone of the reflective surface. A mechanism for transmitting power from the drive means 14 to the shade 13 may be any known mechanism such as what employs a parallel rink or what employs feed screws and nuts.

In order to control the quantity of light by the light emission control means 4, it may be suffice to control current and supply power values with respect to the light source (e.g., an incandescent bulb or a discharge lamp). Moreover, the light color is controlled by controlling the position of a filter member (the shades 9 and 13 in FIGS. 2 and 3 may be replaced with the filter members, respectively).

According to the invention then, the base beam formed by the first light-emitting portion 2_1 and the auxiliary beam with the variable light distribution by the second light-emitting portion 2_2 are combined to form a composite beam for specifying the light distribution.

The emitted light can effectively be utilized by, for example, using the base beam formed by the first light-emitting portion 2_1 as a low beam at the time of passing cars coming from the opposite direction and using part of the high beam for widely lighting over the forward field of the vehicle (in this case, the high-beam light source or a filament, part of the reflector zone, a lens member and the like constitute the first light-emitting portion 2_1). In other words, a high-beam lamp (or a high-beam lamp portion) has been switched off or kept unused at the time of emitting the low beam as the low and high beams have so far been switched for selective use. However, according to the invention, the forward visual recognizability is made improvable by switching on the high-beam light source or the filament even at the time of emitting the low beam so as to emit the auxiliary beam by using the high beam reflector or part of the reflector zone.

The beam formed by the second light-emitting portion 2_2 is preferably so arranged as to be able to mainly light center lines on roadways or shoulders thereof. The reason for this is that in bad weather (rainy, cloudy and snowy weather), driving while keeping the traffic lane becomes hardly easy because the dark road surface makes it difficult to find the road shoulder and the center mark. In this case, though a way of dealing with the situation by increasing the quantity of light may be considered, it is likely to increase power consumption and to dazzle pedestrians thereby. Therefore, using the auxiliary beam for shining road shoulders and lane marks is practical and effective.

Figure 4:
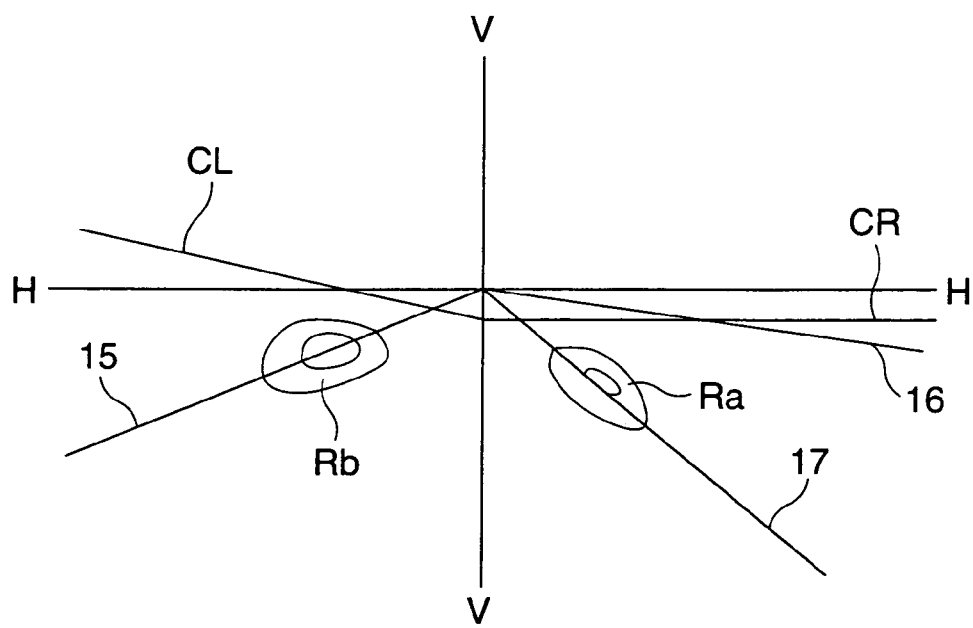
FIG. 4 is a diagram showing, together with FIG. 5, examples of auxiliary beam light distribution in bad weather, an example of distribution pertaining to the auxiliary beam.
Figure 5:
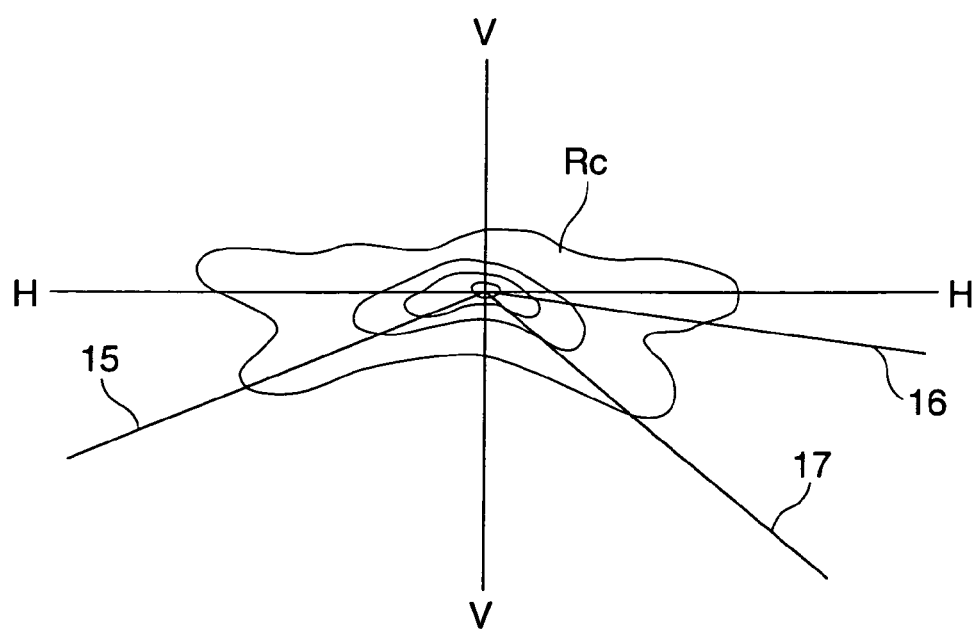
FIG. 5 is a diagram showing an example of distribution at the time of emitting a high beam.

FIGS. 4 and 5 schematically show examples of light distribution by the second light-emitting portion 2_2: FIG. 4 shows light distribution in bad weather (mode); and FIG. 5, light distribution at the time of emitting the high beam. In these drawings, a line H—H designates a horizontal line and a line V—V designates a vertical line together with a broken line as a cut-line (or a cutoff). More specifically, in the countries where cars must be driven on the left-hand side according to the Road Traffic Act, a cut-line CL positioned on the left-hand side of the vertical line V—V extends upward obliquely to the left, whereas a cut-line CR positioned on the right-hand side of the vertical line V—V extends in parallel to the horizontal line H—H. Further, a line 15 on the left-hand side of the road indicates the shoulder line of the road on which one is driving a car and a line 16 on the right-hand side of the road indicates the shoulder line of the road on which cars are coming from the opposite direction. A line 17 indicates the center line extending downward obliquely to the right from the intersection between the horizontal line H—H and the vertical line V—V.

The center line (the line 17) about 10 meters ahead on one's own driving lane in rainy weather as shown by a range Ra that is positioned slightly below the cut-line CR and on the right-hand side of the vertical line V—V in FIG. 4, and the lane mark (the line 15) on the road shoulder as shown by a range Rb that is positioned below the horizontal line H—H and on the left-hand side of the vertical line V—V intensively receives light. Thus, the emission pattern of the low beam formed by the first light-emitting portion 2_1 is formed so as to define the light distribution. In other words, the ranges Ra and Rb are obtained by utilizing part of the beam emitted from the second light-emitting portion 2_2. However, the light reflected from part of the reflector constituting the relevant light-emitting portion, for example, it is desirable to use the light reflected from the peripheral zone of the reflector.

In this way, driving intended for keeping the lane in rainy weather is made easy by adding part of the beam emitted to the road shoulder and the lane mark to the low beam whereby to assure driving safety.

As the whole reflective surface of the reflector constituting the second light-emitting portion 2_2 is used to emit light when the high beam is emitted, the forward field of the vehicle is brightly illuminated and moreover the visual recognizability of the lane mark and the road shoulder is improved since the light is also emitted to the ranges Ra and Rb.

When bad weather is judged, the second light-emitting portion 2_2 may be switched on manually by entrusting the judgement to the driver or otherwise the second light-emitting portion 2_2 may be so controlled that it is switched on and off by utilizing the detected results of weather conditions. In the latter case, there are a method of directly detecting the weather conditions and a method of presuming the weather conditions from indirect information: the former method includes image processing based on the information obtained from a forward photographing camera and installing various sensors for detecting rain drops, temperature, humidity, ambient illumination and the like in order to judging the detected information comprehensively; and the latter method includes making the most of a device that is expected to be operated in company with the weather variation represented by a wiper operating signal or a signal indicating the wiper condition. Incidentally, the communication between the road and the vehicle, and FM multiplex communication can needless to say be utilized for the acquisition of the weather information.

While the vehicle is running at high speed, an auxiliary beam fit for the vehicle speed should preferably be used and for this purpose, the distribution of the light beams formed by the second light-emitting portion 2_2 may be so defined as to irradiate a field on and near the cutoff that divides the distribution of the low beams into a light and a shade side with a boundary therebetween.

Figure 6:
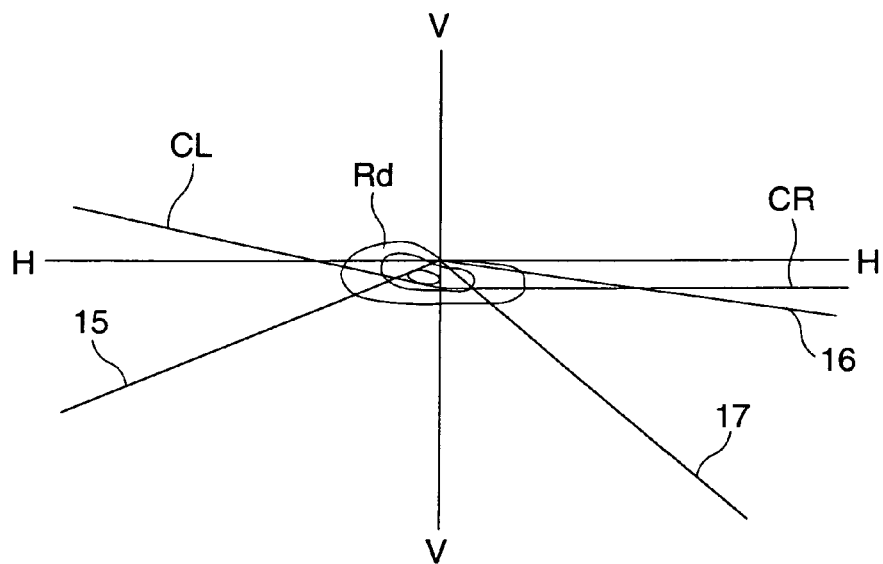
FIG. 6 is a diagram showing, together with FIG. 7, an example of light distribution in a high-speed travel mode or an example of distribution relative to the auxiliary beam.
Figure 7:
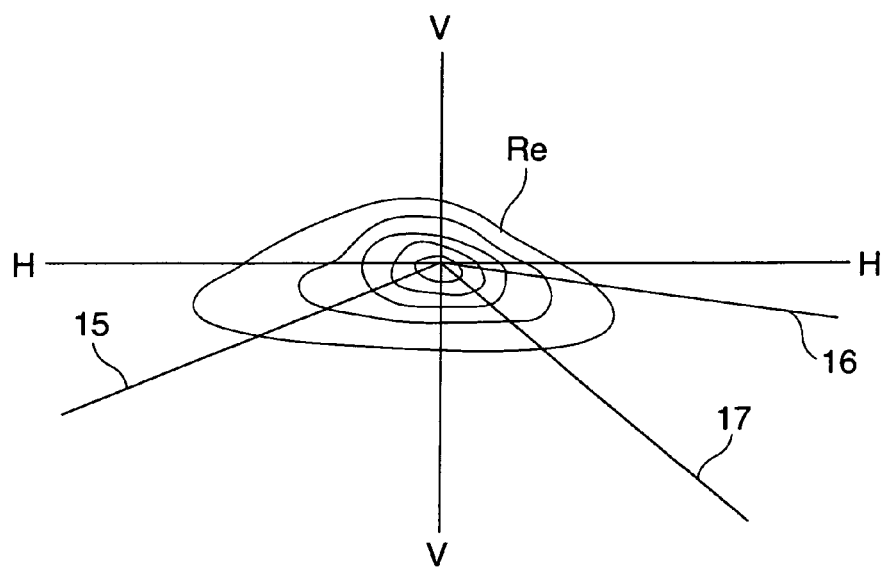
FIG. 7 is a diagram showing an example of distribution at the time of emitting the high beam.

FIGS. 6 and 7 schematically show examples of light distribution by the second light-emitting portion 2_2. FIG. 6 shows light distribution at the time of high-speed traveling and FIG. 7 shows light distribution at the time of emitting the high beam. In this case, the meaning of the horizontal line H—H and the vertical line V—V, and the definitions of the cutoff shown by the broken line, the road shoulder lines 15 and 16 and the center line 17 shown by solid lines are as described previously.

As seen from an emission range Rd of FIG. 6, concentrated illumination (focusing light emission) carried out on and near the cutoff in the high-speed travel mode is intended to assure the visual recognizability of a distance place. To this end, it is desirable to utilize the reflected light in a peripheral zone out of the reflective surface of the reflector constituting the second light-emitting portion 2_2. Although this beam emission is added to the low beam formed by the first light-emitting portion 2_1 so as to define the whole light distribution, travel safety is improved as a visually recognizable distance becomes longer on highways having dazzling protective fences such as guardrails or at the time of high-speed traveling on suburban roads where there are a few oncoming cars. As the light emission is not carried out far upward when compared with the high beam, any preceding or oncoming car would not so much suffer from the glare problem.

At the time of emitting the high beam, moreover, the forward field of the vehicle can be irradiated in a wide range as illumination light to which the central zone of the reflective surface of the reflector contributes is added to the range Rd as shown by an emission range Re of FIG. 7.

Switching to the high-speed high beam mode may be made manually by putting it into the driver's hands or automatically. In the latter case, for example, whether the use of the auxiliary beam is needed may be determined according to the travel condition and environment of the vehicle on the basis of speed information obtainable from a vehicle speed detecting means, image information that a pickup means for monitoring the forward field provides, information from a radar sensor and further road information obtainable from a navigation system and road-to-vehicle communication (about a kind of road, a road configuration and the like).

When the vehicle travels in the suburban area or on a curved road, it is also preferable to use an auxiliary beam fit for the travel environment. In order to do so, the distribution of the beams formed by the second light-emitting portion 2_2 may be so defined as to irradiate a field beneath and near the cutoff that divides the distribution of the low beams into a light and a shade side with a boundary therebetween.

Figure 8:
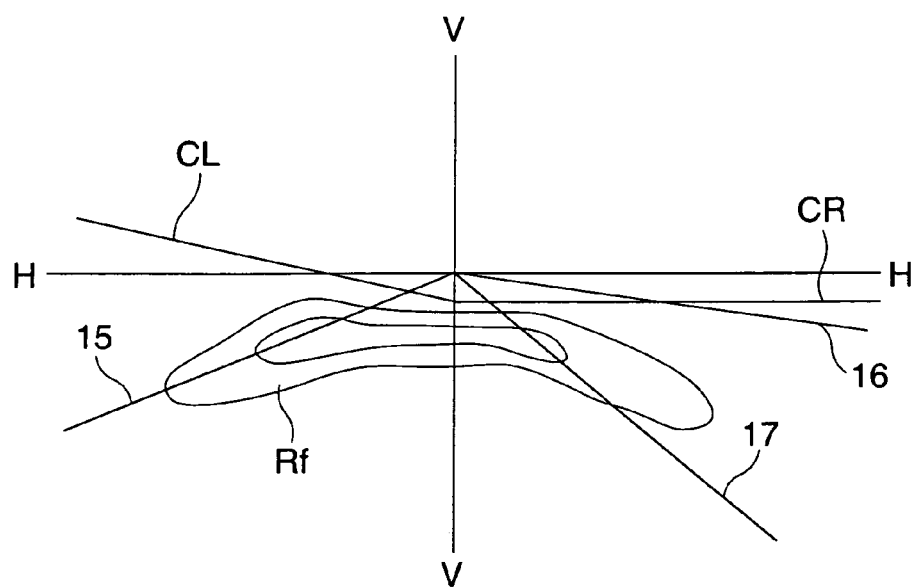
FIG. 8 is a diagram showing, together with FIG. 9, an example of light distribution in a suburban area travel/curved road travel mode or an example of distribution relative to the auxiliary beam.
Figure 9:
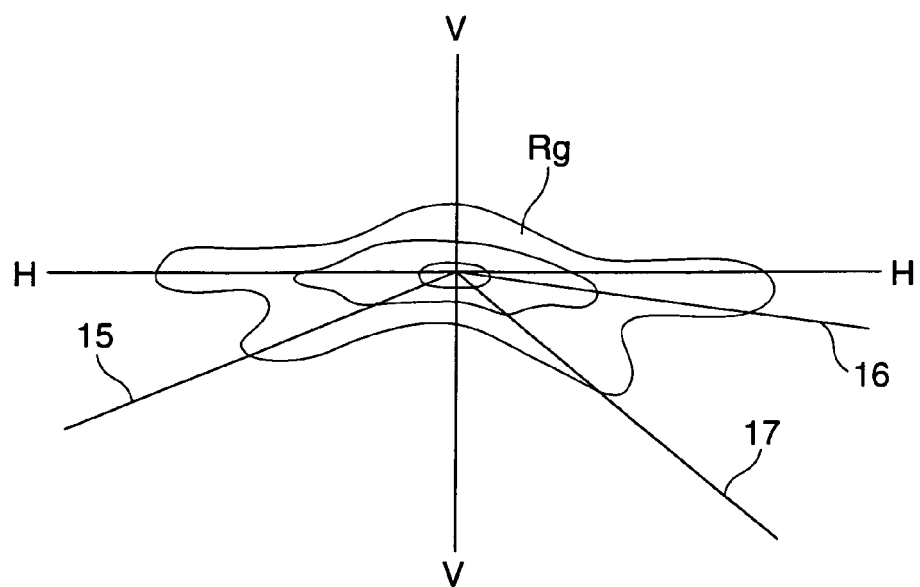
FIG. 9 is a diagram showing an example of distribution at the time of emitting the high beam.

FIGS. 8 and 9 schematically show examples of light distribution by the second light-emitting portion 2_2. FIG. 8 shows light-emitting portion at the time of traveling in the suburban area or on a curved road and FIG. 9 shows light distribution at the time of emitting the high beam. In this case, the meaning of the horizontal line H—H and the vertical line V—V, and the definitions of the cutoff shown by the broken line, the road shoulder lines 15 and 16 and the center line 17 shown by the solid lines are as described previously.

As seen from an emission range Rf of FIG. 8, light distribution that is positioned below the cutoff and strongly diffusive in the horizontal direction is made obtainable in the suburban area travel/curved road travel mode. This is intended to assure lateral visual recognizability in a range close to one's own vehicle, whereby any pedestrian near a crossing or the shoulder of a road where the vehicle is about to make a turn becomes easily visually recognizable. When the auxiliary beam like this is formed, it is desirable to utilize the reflected light in the peripheral zone out of the reflective surface of the reflector constituting the second light-emitting portion 2_2. Although this beam emission is added to the low beam formed by the first light-emitting portion 2_1 so as to define the whole light distribution, any preceding or oncoming car would not so much suffer from the glare problem because the light emission is not carried out upward on the vertical line V—V.

At the time of emitting the high beam, as illumination light to which the central zone of the reflective surface of the reflector contributes is added to the range Rf as shown by an emission range Rg of FIG. 9, both ranges including the range involved and a strongly focusing turned-up emission range positioned above the range involved can be irradiated (whereby the central luminous intensity portion in the light distribution is positioned higher than what is shown in FIG. 8).

Switching to the suburban area travel/curved road travel mode may be made manually or automatically and when the automatic switching is employed, whether the use of the auxiliary beam is needed may be determined according to the travel condition and environment of the vehicle on the basis of speed information obtainable from the vehicle speed detecting means, information on the steering angle detected, image information that the pickup means for monitoring the forward field provides, information from the radar sensor and further road information obtainable from the navigation system and road-to-vehicle communication (about a kind of road, a road configuration and the like).

Although the auxiliary beam formed by the second light-emitting portion 2_2 is formed by the contribution of light from part of the reflector constituting the light-emitting portion, it is preferable to form the auxiliary beam with the light reflected from the peripheral zone of the reflective surface of the reflector. The reason is that the formation of the auxiliary beam by utilizing part of the central zone of the reflector (a zone near the optical axis) may badly affect the light distribution in the case of forming the emission beam by using the whole reflective surface of the reflector, which may also make it difficult to design the configuration of the reflective surface.

In the above description, as to the method of controlling light distribution by the light emission control means 4, the example is illustrated in which the driving mechanism for the light shielding member is used for that purpose, but if a selective beam switching control is performed instead, since the necessity of the driving mechanism for the optical components can be obviated, it is preferable to reduce the number of components involved and to improve the durability of the apparatus. In other words, the first light-emitting portion is constructed such that either or both of the high and low beams are selectively emitted, and a plurality of luminescent portions (for example, a plurality of filaments in the case of an incandescent bulb, and a plurality of arcs in the case of an electric-discharge lamp) are provided in the light source constituting the second light-emitting portion, whereby the irradiation range is changed by switching these luminescent portions.

In a case where an incandescent bulb (a halogen bulb or the like) is used as the light source constituting the second-light emitting portion, it is preferable to provide a luminescent portion including a filament and a light shielding member disposed so as to (locally) cover the periphery of the filament, whereby a remote side area irradiation beam or a near side area irradiation beam is constructed to be emitted when the luminescent portion is made luminous (a specific construction will be described later). Namely, since only light required for the remote side area irradiation or near side area irradiating beam can be made use of at a reflector, designing the configuration of a reflecting surface can be simplified.

In addition, in a case where there is provided a luminescent portion including two filaments as the light source constituting the second light-emitting portion, there is proposed below a construction in which the two filaments are disposed such that:
  (i) central axes thereof extend along the optical axis of the light-emitting portion; or
  (ii) the central axis of one of the filaments extends along the optical axis of the light-emitting portion, whereas the central axis of the other filament extends in a horizontal direction which orthogonally intersects with the central axis of the light-emitting portion (a so-called C-8/C-6 type twin-filament construction).

In either case, since the two filaments only have to be switched over for illumination, the headlamp apparatus according to the present invention is advantageous in that the construction and control can be simplified and that the design of the configuration and light distribution of a reflector can be facilitated.

FIGS. 10 to 15 show an embodiment of the invention applied to an automotive headlamp apparatus. In this embodiment of the invention, the headlamp apparatus is assumed to be a so-called four lamps type headlamp apparatus wherein low-beam emitting lamps and high-beam emitting lamps are separately mounted in the forepart of a vehicle. This headlamp apparatus is arranged so that, for example, a discharge lamp (e.g., a metal halide lamp) is used as a light source for the low-beam emitting lamp, and a halogen bulb (e.g., an H1 bulb) is used as a light source for the high-beam emitting lamp. As the arrangement of the low-beam emitting lamp is well known, the description thereof will be omitted and the description of the high-beam emitting lamp will now be given (at the time of emitting the low beam, part of the beam is used as the auxiliary beam and at the time of emitting the high beam, the whole beam is employed and then the high-beam emitting lamp together with the low-beam emitting lamp is lighted).

Figure 10:
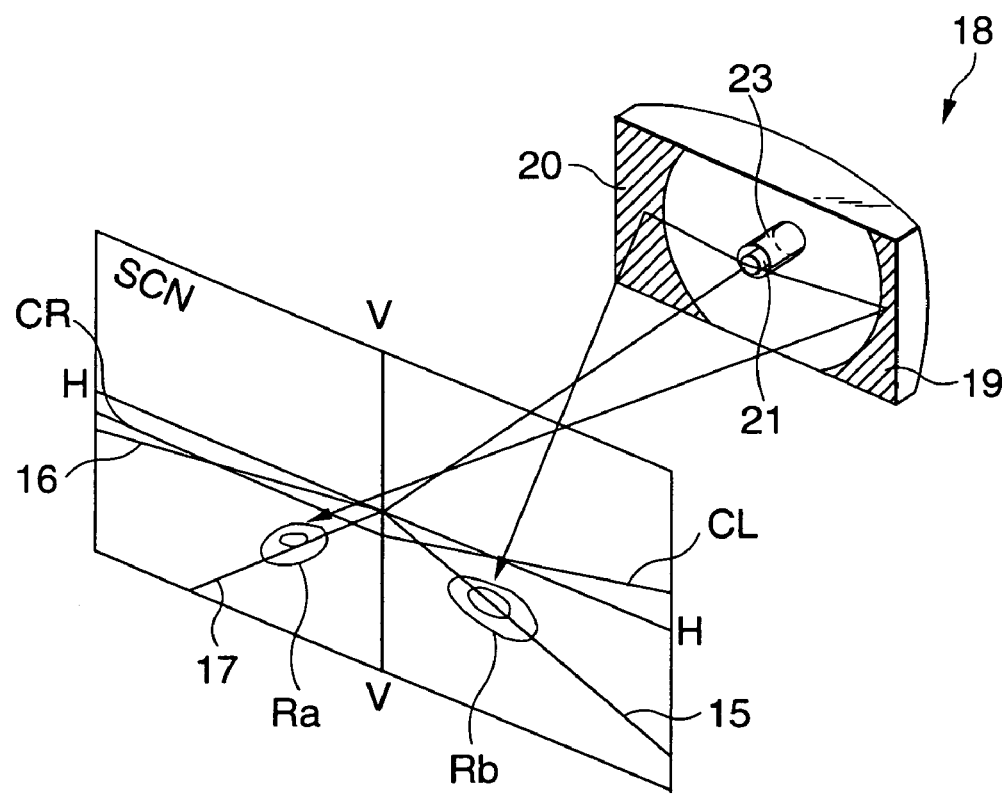
FIG. 10 is a diagram illustrating, together with FIG. 11, a lamp to be used in bad weather, schematically showing the lamp and its optical function.
Figure 11:
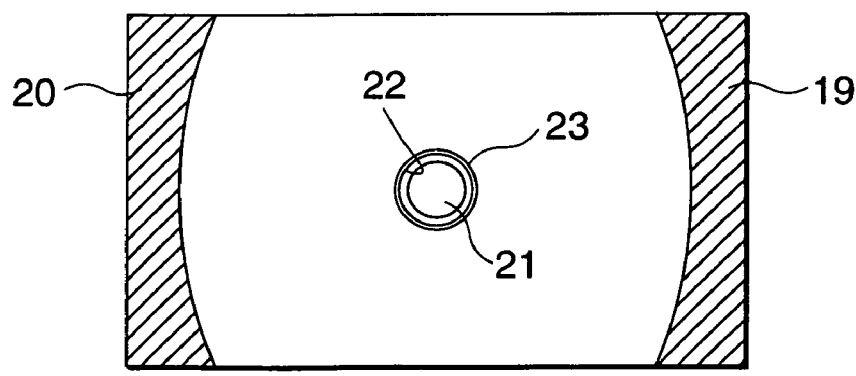
FIG. 11 is an elevational view of the lamp with its front lens removed.

FIGS. 10 and 11 show an exemplary arrangement 18 of a lamp for use in the bad weather mode.

FIG. 10 is a schematic diagram showing the lamp construction and a reflective action by the peripheral zones of a reflector. In the bad weather mode, light from a light source 21 is emitted only to the peripheral zones 19 and 20 as shown by slant lines of FIG. 10 and then the reflected light is emitted onto a screen SCN disposed in front of the lamp via a lens member (a front lens, not shown). In other words, a projection pattern is cast over a range Ra on the screen SCN by the peripheral zone 19, whereas a projection pattern is cast over a range Rb on the screen SCN by the peripheral zone 20 (see FIG. 4). A line H—H indicates a horizontal line and a line V—V, a vertical line on the screen.

FIG. 11 is an elevational view of the lamp with the lens member removed and a light-source fitting hole 22 (a circular hole) is formed in the center of the reflector.

A rotary parabolic surface may be employed as a surface configuration for the peripheral zones 19 and 20, and their rotary central axes are set to tilt laterally and downwardly with respect to the main optical axis of the reflector (the axis passing the intersection point between the horizontal line H—H and the vertical line V—V, passing through the center of the light-source fitting hole 22 and extending longitudinally). In other words, the rotary central axis of the rotary parabolic surface constituting the peripheral zone 19 is set to be directed to the specific range Ra on the center line 17, whereas the rotary central axis of the rotary parabolic surface constituting the peripheral zone 20 is set to be directed to the specific range Rb on the shoulder line 15 of one's own driving lane.

A target angle as well as a diffusion degree of the emission light is needless to say controllable by adding the optical (refractive) action of a lens (prism) step formed on the front lens to the light reflected by each peripheral zone.

Of the reflective surface, a surface configuration of an inner zone close to the light-source fitting hole 22 may be optional as long as it is diffusive mainly in the horizontal direction and a curved one that makes available reflected light contributing to the high-beam light distribution (e.g., a composite parabolic-elliptic surface), the way of sectioning the zone being unimportant in this case.

As the light source 21 (shown by a circle in FIG. 11), use can be made of, for example, an incandescent bulb (e.g., a halogen bulb) whose central axis of the filament is disposed along the main optical axis of the reflector (in a so-called C-8 filament position). Then the focal point of the rotary parabolic surface constituting the peripheral zone is set in a position at the rear end of the filament or slightly behind the rear end thereof (on the reflector side).

Further, it is preferable for a shade 23 to be cylindrical as the cylindrical shape is simplest for the purpose of covering the periphery of the light source 21.

The arrangement shown in FIG. 3 may be used to drive and control the shade, for example. More specifically, the shade 23 is movably supported along the optical axis of the reflector, and light is emitted from the front end portion of the light source 21 to only the peripheral zones 19 and 20 in such a state that the shade 23 has been retracted to the rearmost (first) position. In such a state that the shade 23 has come up to the foremost (second) position, the light is not almost nearly shielded, so that the light from the light source 21 is emitted to the whole reflective surface.

Figure 12:
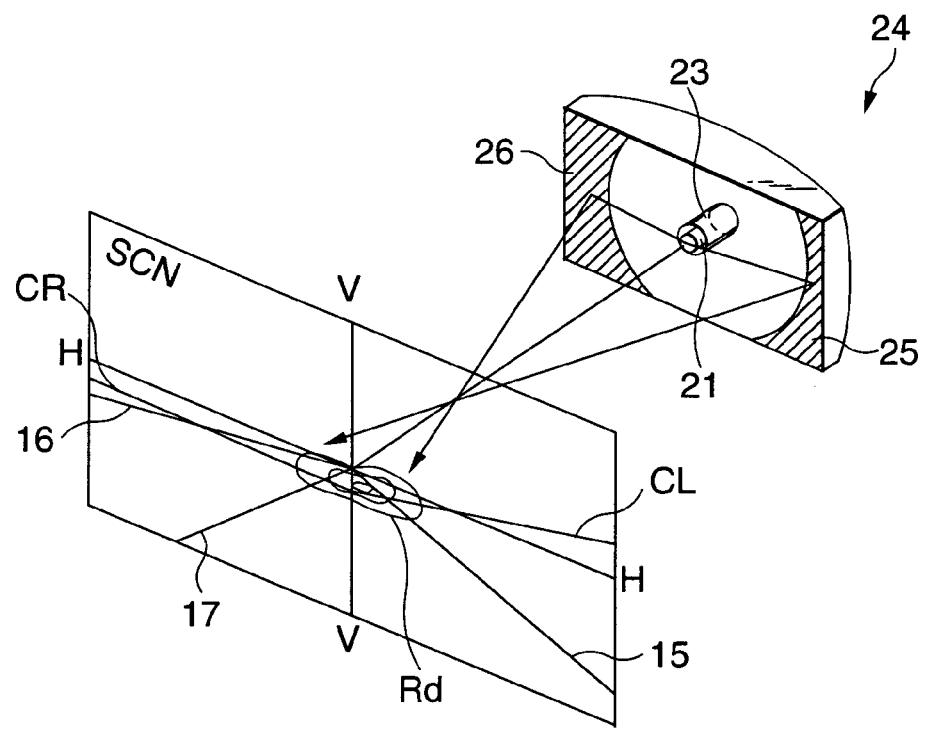
FIG. 12 is a diagram illustrating, together with FIG. 13, a lamp to be used in a high-speed travel mode, schematically showing the lamp and its optical function.
Figure 13:
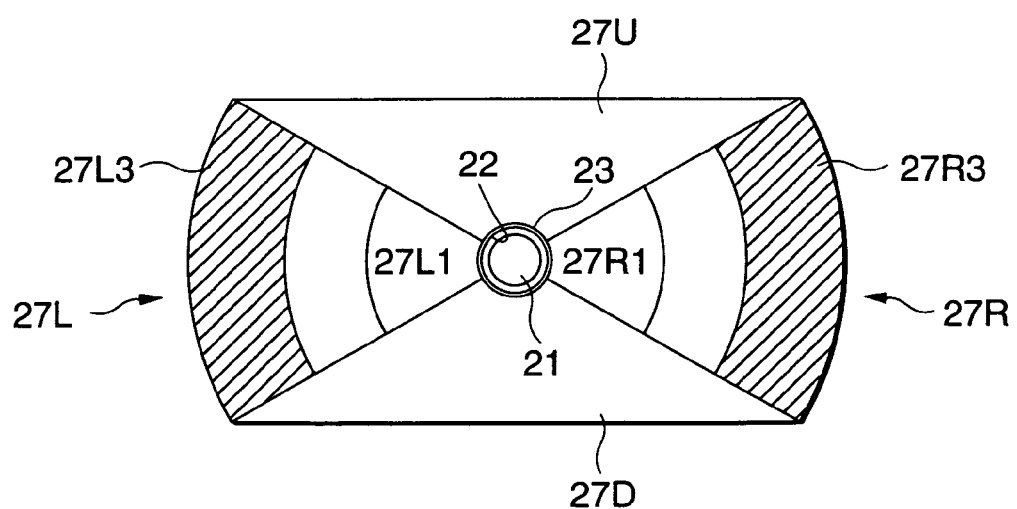
FIG. 13 is an elevational view of the lamp with its front lens removed.
Figure 14:
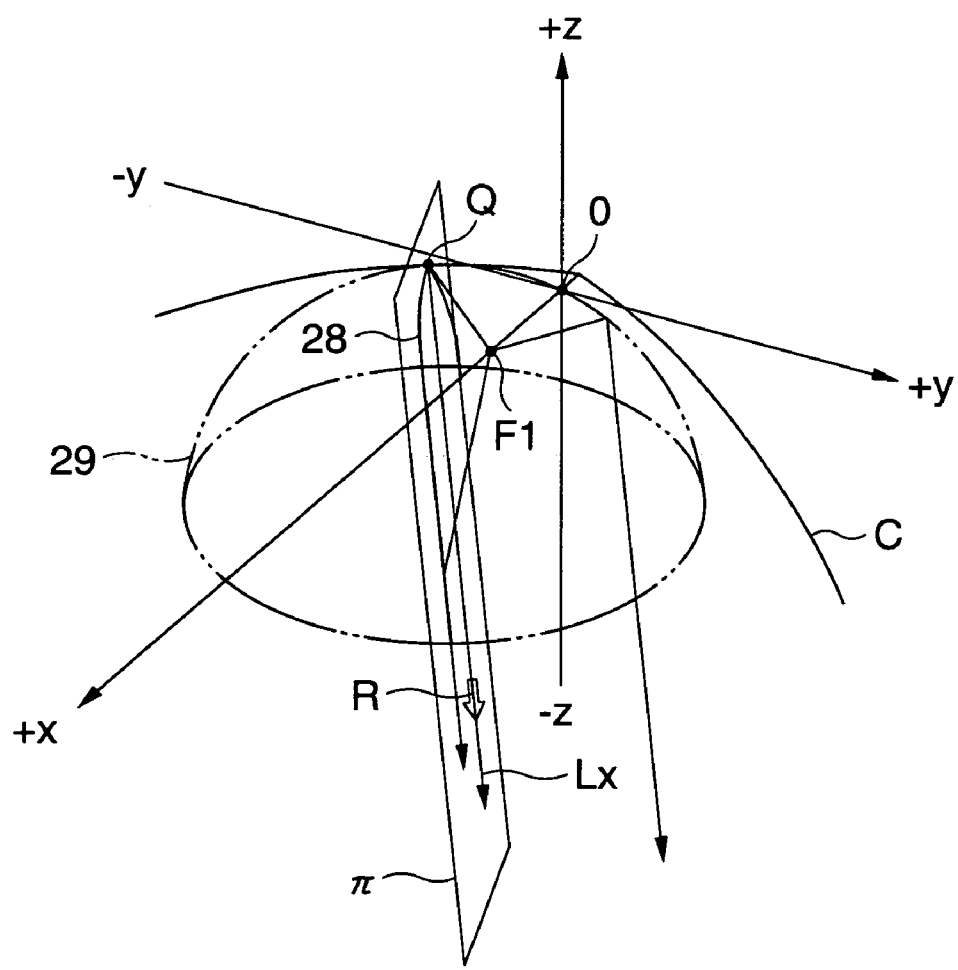
FIG. 14 is a diagram illustrating another example of the reflective surface.

FIGS. 12 to 14 show an exemplary arrangement 24 of a lamp for use in the high-speed travel mode.

FIG. 12 is a schematic diagram showing the lamp construction and a reflective action by the peripheral zones of the reflector. In the high-speed travel mode, light from the light source 21 is emitted only to the peripheral zones 25 and 26 as shown by slant lines of FIG. 12 and then the reflected light is emitted onto the screen SCN disposed in front of the lamp via the lens member (the front lens). In other words, a projection pattern is cast over the range Rd on the screen SCN by the peripheral zones 25 and 26 (see FIG. 6).

In this case, a rotary parabolic surface may be employed as a surface configuration for the peripheral zones 25 and 26, and their rotary central axes are set parallel or substantially parallel to the main optical axis of the reflector.

The reflector may be, for example, a composite surface having a plurality of reflective zones in combination as shown in an elevational view of FIG. 13.

The light-source fitting hole 22 is formed in the center of the reflector, which is divided into four zones 27U, 27D, 27L and 27R by two planes that pass through the light-source fitting hole 22 and are tilted at a predetermined angle with respect to a horizontal plane including the main optical axis of the reflector.

In the fan-shaped zones 27L and 27R respectively positioned on the left- and right-hand sides of the light-source fitting hole 22, fan-shaped inner zones 27L1 and 27L1 formed directly on the respective sides of the light-source fitting hole 22 are formed into parabolic-elliptic composite surfaces. By the parabolic-elliptic composite surface is meant that one cross section (a vertical cross section or a section on the plane tilted at a predetermined angle relative thereto) is parabolic and also elliptic relative to a cross section perpendicular to the one cross section above so as to form a curved surface on which the focal point of the parabola and one of the focal points of the ellipse are located in the same position (i.e., have a common focal point).

Further, peripheral zones 27L3 and 27R3 (i.e., the remotest zones from the light-source fitting hole 22, corresponding to the respective zones 25 and 26) in the fan-shaped zones 27L and 27R form rotary parabolic surfaces whose focal points are positioned, for example, at the rear end or slightly behind the filament disposed (in the filament C-8 position) along the main optical axis of the reflector. Although the parabolic-elliptic composite surfaces can be employed for the intermediate zones of the fan-shaped zones 27L and 27R, such a surface may be any surface as long as reflected light substantially diffusive in the horizontal direction is obtainable.

For the rest of zones 27U and 27D, the rotary parabolic surfaces having a focal point common to the focal points of the (rotary parabolic) surfaces forming the respective peripheral zones 27L3 and 27R3 (though different in focal length) or the parabolic-elliptic composite surfaces having a focal point common to the focal points thereof are employed.

For the surface configurations of the peripheral zones 25 and 26 of the reflector, any other curved surface generated at the steps shown in FIG. 14 may be employed.

With respect to the orthogonal coordinate system x-y-z set in FIG. 14, the x-axis represents an axis extending in the direction of the optical axis of the reflective surface; the z-axis, an axis extending in a direction perpendicular thereto; and the y-axis, a horizontal axis perpendicular to the x- and z-axis.

A reference curved line C that is set within the plane x-y is a secondary curved line such as a parabola or ellipse or otherwise a composite curved line (e.g., what consists of a plurality of parabolic curved line segments different in focal point position and in focal length) in the form of a secondary curved line including a plurality of curved line segments.

Supposing an imaginary point of light source is placed on a point F1 set on the x-axis, the light reflected at a point Q before it is directed from the point F1 to the point Q on the reference curved line C proceeds in the direction of a beam vector shown by an arrow R in FIG. 14. This direction shown by the arrow R is obvious from the reflective rule and when the point Q is moved on the reference curved line C, it is seen that the direction of the beam vector of the reflected light varies each time the position of the point Q varies.

When the light generated from the focal point F1 is reflected at an optional point Q on the reference curved line C, the direction of the reflected light (i.e., the direction of the beam vector R) is calculated. Then a parabola 28 having an optical axis Lx with the point F1 as a focal point and with the beam vector R as a directional vector is generated relative to the point Q.

The parabola 28 is obviously obtainable as a sectional curved line when an imaginary rotary parabolic surface 29 with the Lx as an optical axis and with the point Q as an apex is taken into consideration and when the imaginary rotary parabolic surface 29 is cut by a plane $\pi$ including what includes the optical axis Lx and what is parallel to the z-axis.

As the imaginary rotary parabolic surface 29 like this exists at the optional point Q on the reference curved line C, a sectional curved line (a parabola) is determined on an optional point Q basis when the imaginary rotary parabolic surface 29 is cut by a plane parallel to the z-axis including the optical axis (a straight line that makes the beam vector of the reflected light at Q a directional vector).

A single curved surface becomes obtainable by forming the reflective surface as a continuous body of parabolic group.

Thus, the direction of the reflected light in a position close to the peripheral edges of the peripheral zones 25 and 26 is made substantially parallel to the main axis of the reflector by using the peripheral zones 25 and 26. In the vicinity of the light-source fitting hole 22, the curved surface configuration is so defined as to gradually increase the diffusion angle in the horizontal direction (a beam vector angle toward the vertical plane including the main axis of the reflector) in order to form a high luminous-intensity zone in the range Rd as shown in FIG. 6 (as the reflected light in a position closer to either lateral peripheral edge on the reflective surface gradually becomes parallel light relative to the main axis of the reflector whereby to contribute to the formation of the central luminous intensity on the light distribution pattern).

Even in this embodiment, the shade 23 is movably supported along the optical axis of the reflector, and light is emitted from the front portion of the light source 21 only to the zones 25 and 26 in such a state that the shade has been retracted to the remotest (first) position, and the light shielded by the shade is almost eliminated whereby to irradiate the whole surface of the reflective surface in such a state that the shade 23 has reached its foremost (second) position.

Figure 15:
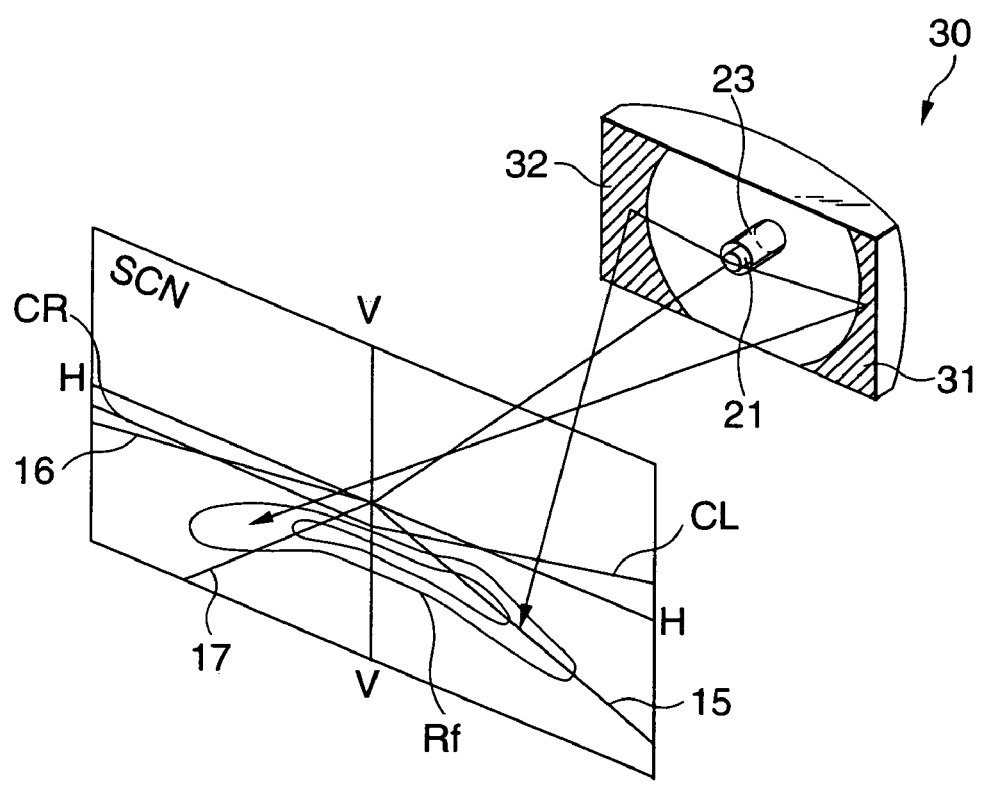
FIG. 15 is a diagram schematically showing a lamp for use in the suburban area travel/curved road travel mode and its optical function.

FIG. 15 shows an exemplary arrangement 30 of a lamp for use in the suburban area travel/curved road travel mode, schematically showing a lamp arrangement and a reflective action by the peripheral zone of the reflector.

In the suburban area travel/curved road travel mode, light from the light source 21 is emitted only to peripheral zones 31 and 32 as shown by slant lines of FIG. 15 and then the reflected light is emitted onto the screen SCN disposed in front of the lamp via the lens member (the front lens). In other words, a projection pattern is cast over the range Rf on the screen SCN by the peripheral zones 31 and 32 (see FIG. 8).

For the surface configurations of the peripheral zones of the reflector, the parabolic-elliptic composite surfaces may be employed. In this case, the horizontal cross section is (partially) elliptic, whereas the vertical cross section is parabolic. Further, the optical axis of the reflective surface is slightly tilted downward with respect to the horizontal plane, whereby light can be emitted in a laterally diffused range below the horizontal line H—H.

Incidentally, the incandescent bulb in the C-8 filament position is employed as the light source and the shade is cylindrical in shape. Moreover, control of driving the shade 23 is conducted in the same way as described previously (light is emitted from the front portion of the light source 21 only to the zones 31 and 32 in such a state that the shade 23 has been retracted to the remotest (first) position, and the light shielded by the shade 23 is almost eliminated whereby to irradiate the whole surface of the reflective surface in such a state that the shade 23 has reached its foremost (second) position.

Although control of the shade position has been conducted according to the two stage system in the description given above, namely, the first position where each of the modes including the high-speed travel mode and suburban area travel/curved road travel mode is used, and the second position used at the time of emitting the high beam, the invention is not limited thereto but also applicable to a more than three stage system by defining the position of the shade beforehand. By selecting a desired position of the shade (in the case of such a three stage system, an intermediate beam between a beam in each mode and a high beam will be utilized as an auxiliary beam) or by continuously defining the shade position according to the vehicle speed and the like (e.g., controlling the beam emission by brightly illuminating this side of the vehicle while the vehicle speed is low and also brightly illuminating the remote side while the vehicle speed is high), various modes for carrying out the invention will be implemented.

FIGS. 16 to 23 show another embodiment of the present invention in which the invention is applied to an automotive headlamp apparatus, and the construction described as i) above is illustrated therein.

Figure 16:
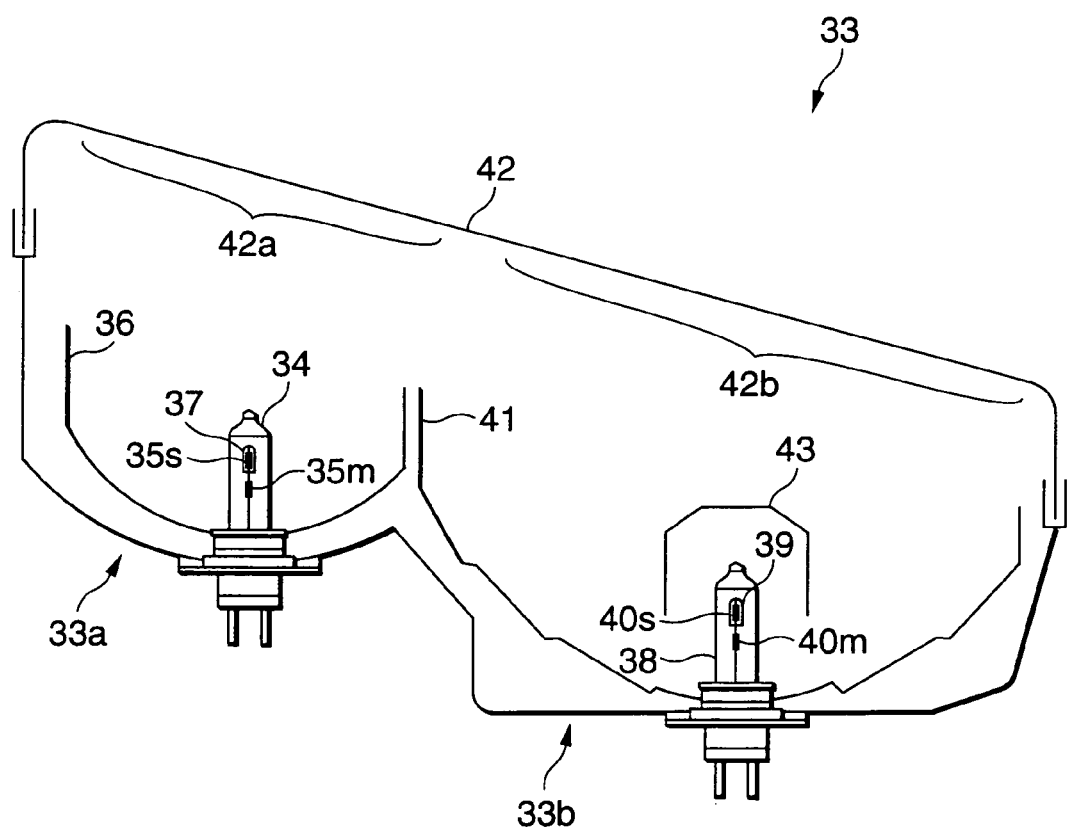
FIG. 16 is a diagrammatic sectional view showing the construction of a headlamp according to an embodiment of the present invention, together with FIGS. 17 to 23, in which the invention is applied to the headlamp.

FIG. 16 is a horizontally sectional view showing the construction of a headlamp 33, which comprises a first lamp portion 33a and a second lamp portion 33b. Used for a reflector constituting these lamp portions is a composite reflector known to be called a step reflector (or a multi-reflector) which is sectioned into a multiplicity of divided areas, and well known surface configurations such as a paraboloid of revolution, elliptic paraboloid, hyperbolic paraboloid and parabolic-elliptic composite surface may be proposed for use as the basic surface configuration of the divided areas.

An incandescent bulb (an H4 bulb) 34 is used for a light source of the first lamp portion 33a and the bulb has two filaments.

Figure 17:
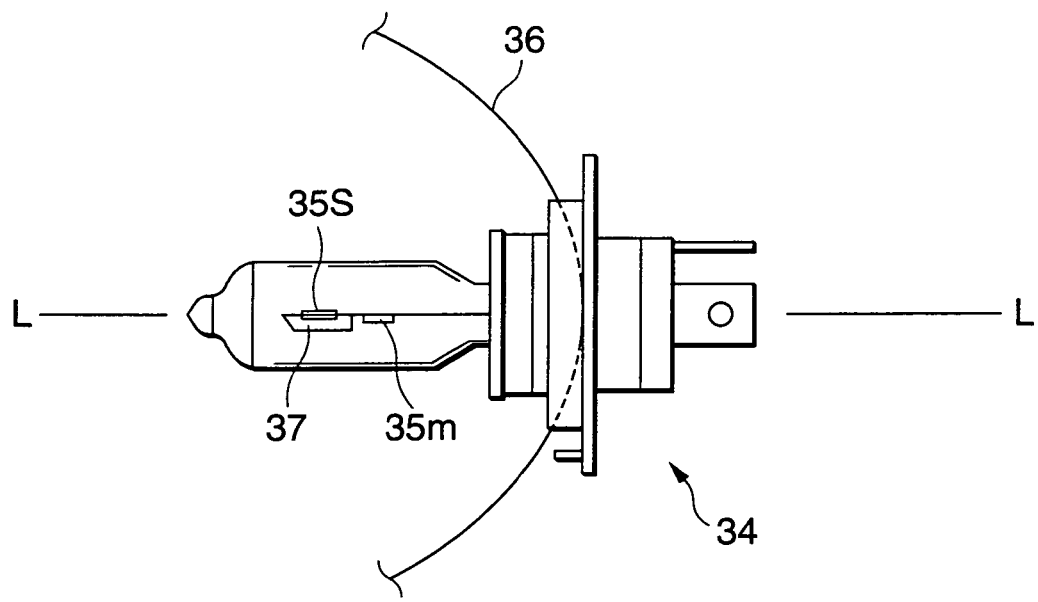
FIG. 17 is a side view showing a bulb.

FIG. 17 shows the construction of the bulb. The two filaments 35s, 35m are disposed such that central axes thereof extend along the optical axis (designated by a line L—L in the figure) of a reflector 36, and of the two filaments the anterior filament (a so-called sub-filament) 35s is accompanied with a shielding member 37 which is disposed to cover the filament from below.

Figure 18:
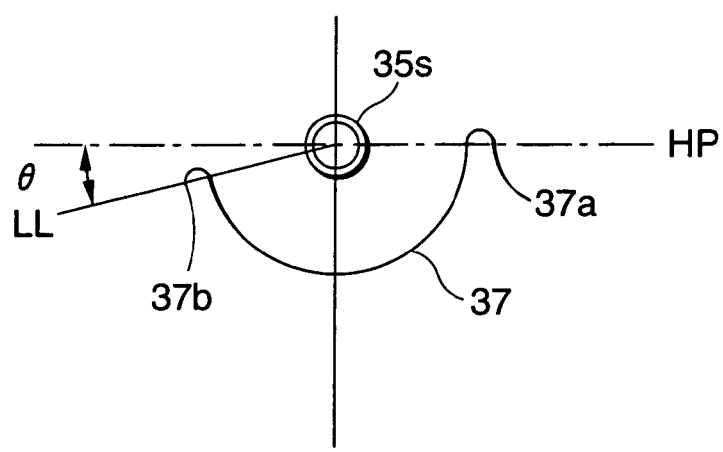
FIG. 18 is an explanatory view for explaining a positional relationship of a sub-filament relative to a shield member according to a first lamp portion.

FIG. 18 is a schematic view showing the posture of the shielding member 37 relative to the filament 35s and shows a state in which the filament and the shielding member are viewed from the front side (namely, a state in which they are viewed in an optical axis direction of the reflector 36). A horizontal line HP designated by an alternate long and short dash line represents a horizontal (reference) plane passing through the central axis of the filament and extending horizontally.

As is seen from the figure, while one end (a right end) portion 37a of the shielding member 37 reaches the horizontal plane HP, the other end (an left end) portion 37b thereof is positioned below the horizontal plane HP, and it is a well known fact that light emitted to the reflecting surface through a gap between this end portion and the horizontal plane HP (in the figure, an angle formed between a half-line LL (representing an inclined surface) extending from the center of the filament 35s through the left end portion 37b of the shielding member and the horizontal plane HP is described as "Θ") contributes to a luminous intensity distribution positioned directly below a boundary between bright and dark areas (an inclined cut-off line) in a light distribution pattern produced when the low beam is emitted. There is provided no such shielding member for the posterior filament (the so-called main filament) 35m, and a light distribution pattern produced when the high beam is emitted is formed by a reflected light resulting from the light emitted to the reflector when the relevant filament is switched on.

An incandescent bulb (an H4 bulb) 38 is also used for a light source for the second lamp portion 33b (refer to FIG. 16), and the bulb has a (sub) filament 40s which is provided with a shielding member 39 and a (main) filament 40m positioned rearward of the filament 40s, but the mounting posture of the shielding member relative to a reflecting surface 41 is different from that of the aforesaid incandescent bulb 34.

Figure 19:
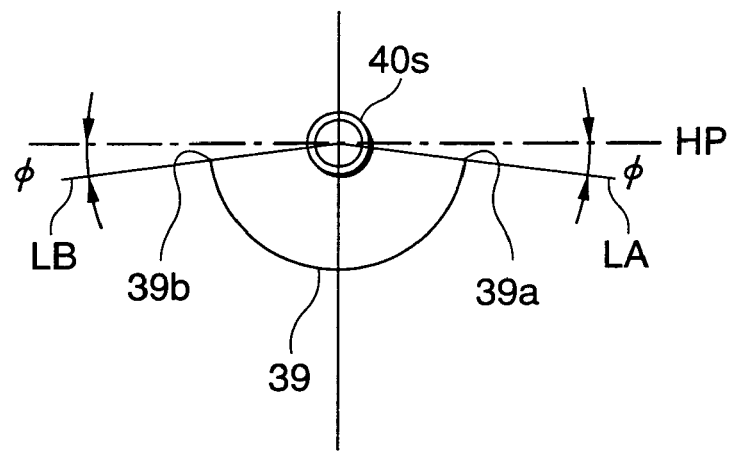
FIG. 19 is an explanatory view for explaining a positional relationship of a sub-filament relative to a shield member according to a second lamp portion.

FIG. 19 is a schematic view showing the posture of the shielding member 39 relative to the filament 40s as viewed from the front, and this state corresponds to a state resulting when the state shown in FIG. 18 is rotated through an angle of Θ/2 about the central axis of the filament in a clockwise direction as viewed in the figure. In other words, both end (left end 39a and right end 39b) portions of the shielding member 39 are positioned below the horizontal plane HT, and angles formed between respective half-lines LA, LB extending from the center of the filament 40s through these end portions and the horizontal plane HP (these are described as "Φ") are Θ/2. For example, if Θ is 15 (degrees), Φ is 7.5 (degrees).

A lens member 42 is shared by the respective lamp portions (refer to FIG. 16) and has a lens portion 42a disposed in front of the reflector 36 constituting the first lamp portion 33a and a lens portion 42b disposed in front of the reflector 41 constituting the second lamp portion 33b. In FIG. 16, a member 43 disposed so as to cover from the front the incandescent bulb 38 of the second lamp portion 33b is a light shielding member for light directly projected from the bulb.

Figure 20:
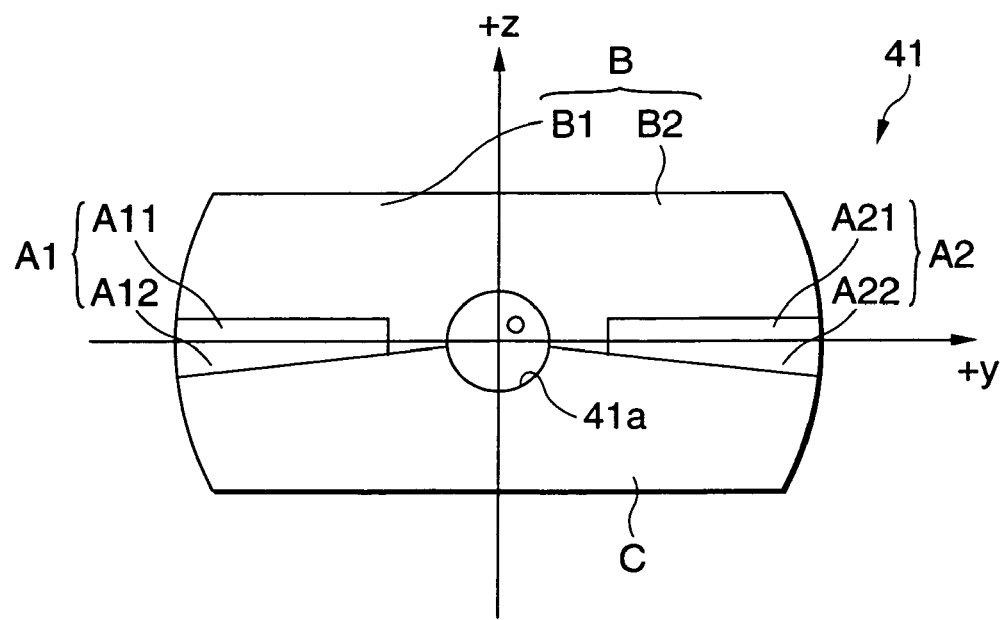
FIG. 20 is an explanatory view for explaining sectioned areas of a reflector according to the second lamp portion.

FIG. 20 shows an example of sectioned areas of the reflector 41, and in setting a three-dimensional rectangular coordinate system, an axis is selected as an x axis (an axis perpendicular to the surface of the drawing paper) which extends in the optical axis direction through the center O of a circular hole 41a formed in the center of the reflector 41 for disposition of a light source, a horizontal axis as a y axis and a vertical axis as a z axis, respectively.

As shown in the figure, the reflecting surface is in general sectioned into four areas A1, A2, B and C. Further, the areas A1 and A2 comprise, respectively, two areas sectioned by an x-y plane and the area B comprises two areas sectioned by an x-z plane.

The area A1 disposed in the vicinity of the x-y plane on the left-hand side of the x-z plane comprises areas A11 and A12, and one of the two areas, i.e., the area A11 is positioned closely above the x-y plane (in the second quadrant of the y-z plane) and the other area A12 is closely below the x-y plane (in the third quadrant of the y-z plane).

In addition, the area A2 disposed in the vicinity of the x-y plane on the right-hand side of the x-z plane comprises areas A21 and A22, and one of the two areas, i.e., the area A21 is positioned closely above the x-y plane (in the first quadrant of the y-z plane) and the other area A12 is closely below the x-y plane (in the fourth quadrant of the y-z plane).

The area B positioned above the x-y plane is sectioned into two areas B1, B2 by the x-z plane, and the area B1 is positioned on the left-hand side of the x-z plane (in the second quadrant of the y-z plane), whereas the area B2 on the right-hand side of the x-z plane (in the first quadrant of the y-z plane).

The area C is an area positioned below the x-y plane, and no light is emitted to this when the filament 40s is switched on because the light from the filament is shielded by the shielding member 39.

Upper boundaries of the areas A1, A2, that is, a boundary between the upper portion of the area A11 and the area B1 and a boundary between the upper portion of the area A21 and the area B2, are defined by lines of intersection between a plane parallel to the x-y plane and the reflecting surfaces, respectively. In addition, lower boundaries of the areas A1, A2, B1, B2, that is, boundaries between the areas A12, B1 and the area C and boundaries between the areas A22, B2 and the area C, are defined, respectively, by lines of intersection between planes extending diagonally downwardly about the axis x relative to the x-y plane (in other words, for the plane including the boundaries between the areas A12, B1 and the area C, it is an inclined plane rotated about the axis x through the aforesaid angle of <D in the counter-clockwise direction as viewed in the figure, and for the plane including the boundaries between the areas A22, B2 and the area C, it is an inclined plane rotated about the axis x through the aforesaid angle of (D in the clockwise direction as viewed in the figure) and the reflecting surfaces.

Figure 21:
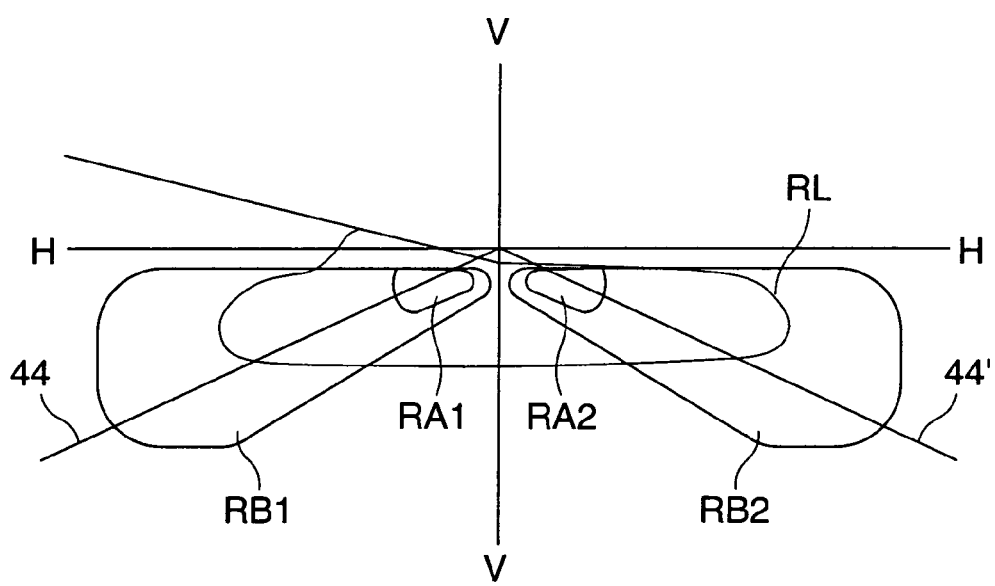
Figure 22:
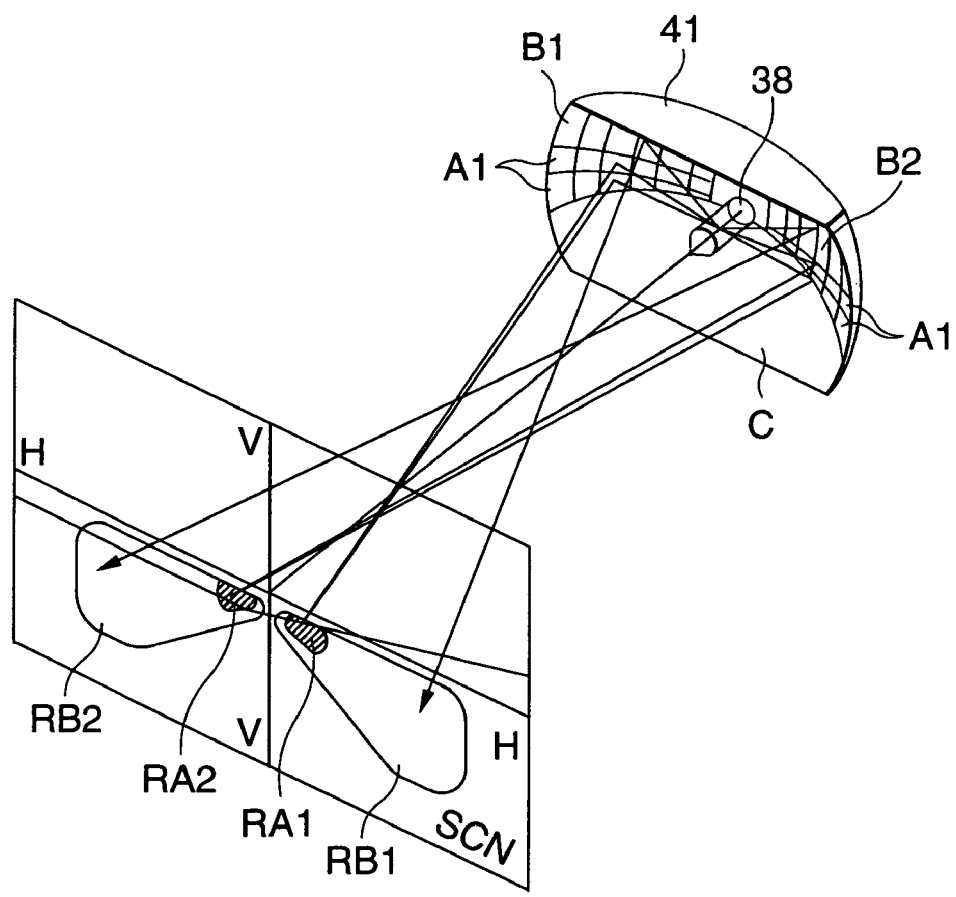
FIG. 22 is a schematic diagram for explaining the sectioned areas of the reflector according to the second lamp portion and optical actions thereof.
Figure 23:
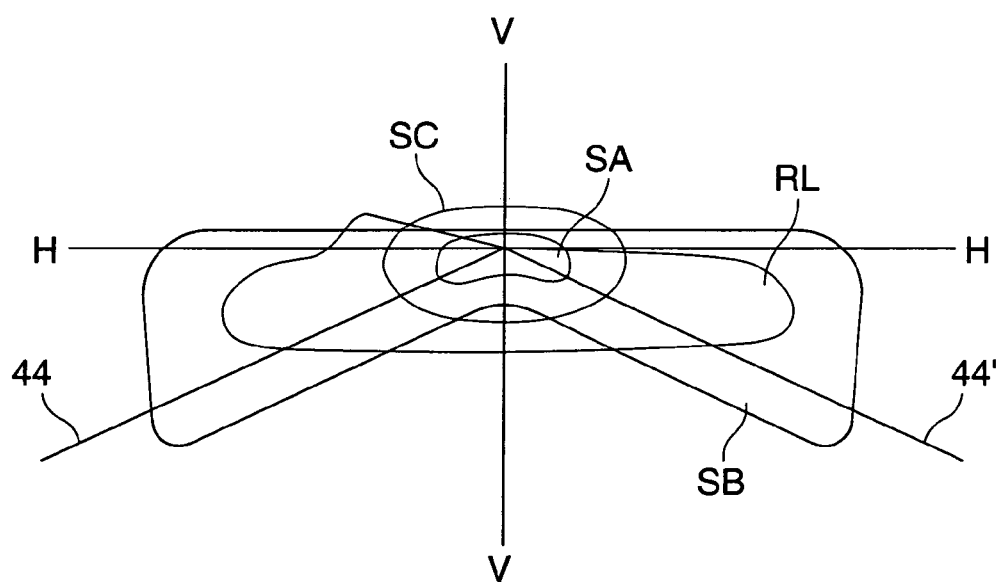

FIGS. 21 to 23 are explanatory views for explaining the light distribution pattern of the headlamp 33. In these figures, a line "H—H" denotes a horizontal line and a line "V—V" a vertical line, respectively.

FIG. 21 is a schematic illustration of light distribution patterns of light emitted forward, respectively, from the filaments accompanied with the shielding members of the first lamp portion 33a and the second lamp portion 33b through the respective reflectors 36, 41 and the lens member 42 when those filaments are switched on. In the figure, lines 44, 44' extending, respectively, from an intersection point between the horizontal line H—H and the vertical line V—V diagonally downwardly to the left and right represent the shoulder of a road and lane marks thereon. This is true in FIG. 23.

A pattern RL resulting when the sub-filament 35s of the first lamp portion 33a is switched on forms, as shown in the figure, a light distribution pattern for the low beam, which is a well known pattern as having an inclined cut-line (or cutoff) situated on the left-hand side of the vertical line V—V (refer to a broken line in the figure) and a horizontal cut-line situated on the right-hand side of the vertical line V—V in countries where the road traffic act rules that vehicles are to be driven on the left-hand side of the road.

On the other hand, a pattern resulting when the sub-filament 40s of the second lamp portion 33b is turned on comprises patterns RA1, RA2 formed by the areas A1, A2 which contribute to a light distribution for a remote side area irradiating beam and patterns RB1, RB2 formed by the areas B1, B2 which contribute to a light distribution for a near side area irradiating beam.

The remote side area irradiating beams are mainly intended to irradiate areas (side areas) on the lines 44, 44' at a remote area ahead of the vehicle (in the vicinity of an intersection point between the H—H line and the V—V line), and when used together with the aforesaid pattern RL, it is possible to improve the visibility with respect to the side areas when running on a high-speed bend.

In addition, the near side area irradiating beams are mainly intended to irradiate areas (side areas) on the lines 44, 44' at a near area ahead of the vehicle and the beams when emitted can widely irradiate the road shoulders and lane marks on one's own lane and a lane for oncoming vehicles. When these beam patterns are used together with the aforesaid pattern RL, it is possible to improve the visibility at an intersection and the visibility with respect to lane marks or the like under bad weather conditions (such as rainy, snowy and foggy weather conditions). In running with the headlamps on in the rain, there is a risk of a reflected light from the road surface due to the specular reflection causing a glare to the driver of an oncoming vehicle, and therefore, it is desirable to have a light distribution in which the road surface just in front of one's own vehicle (excluding the shoulder of the road) is not irradiated as shown by the patterns RB1, RB2.

FIG. 22 schematically shows the reflector 41 constituting the second lamp portion 33b and reflections occurring at the respective areas A1, A2, B1, B2 on the reflector, as well as light emission patterns RA1, RA2, RB1, RB2 resulting on a screen SCN disposed ahead of the vehicle headlamps when reflected lights from the respective areas are emitted onto the screen through the lens member.

In the areas A1, A2, since the filament 40s is situated ahead of the basic focal point (a focal point of a paraboloid of revolution constituting the reference surface of the step reflector) of the reflector 41, when the relative filament is turned on, the reflected lights from the respective areas are emitted forward across the perpendicular plane (the x-z plane) including the optical axis, and the remote side area irradiating beams are formed by the two patterns RA1, RA2 positioned on the sides of the vertical line V—V on the screen SCN. Thus, used as the surface configuration for the reflection elements (small reflecting surfaces) constituting the areas A1, A2 are paraboloid of revolution and elliptic paraboloid which need no large horizontal diffusion property.

In the areas B1, B2, when the filament 40s is turned on, reflected lights from the respective areas are emitted forward across the vertical plane (the x-z plane) including the optical axis, and the near side area irradiating beams are formed by the two patterns RB1, RB2 situated on the sides of the V—V line on the screen SCN. To make this happen, since a relatively large horizontal diffusion property is required for the surface configuration for the reflecting elements (small reflecting surfaces) constituting the areas B1, B2, hyperbolic paraboloid, boat-shaped hyperbola, parabolic-elliptic composite surface and the like are used.

FIG. 23 is a schematic view showing light distribution patters resulting from lights emitted forward when the sub-filament 35s of the first lamp portion 33a and the main filament 40m (without a shield) of the second lamp portion 33b are turned on.

In this case, although the light emission pattern by the first lamp portion 33a is identical to the pattern RL shown in FIG. 21, the light emission patterns by the second lamp portion 33b become patterns as designated by SA, SB, SC in the same figure.

Namely, the pattern SA is a light emission pattern obtained by the areas A1, A2 and is identical to a pattern resulting when the separate remote side area irradiating beams in FIG. 21 are combined together. In addition, when compared with the patterns RA1, RA2 in FIG. 21, the pattern SA provides an irradiating beam oriented slightly upwardly. The reason for this is because the basic focal point of the reflector is designed to be situated at the center of the filament 40*m* when the filament is turned on.

This tendency is recognized with respect to the light emission pattern SB obtained by the areas B1, B2 and this pattern SB becomes identical to a pattern resulting when the separated near side area irradiating beams in FIG. 21 are combined together. When compared with the pattern in FIG. 21, the pattern SB provides an irradiating beam oriented slightly upwardly.

The pattern SC is a pattern obtained by the area C, and as shown in the figure, it is situated substantially at the center of the patterns and contributes to a remote illumination light in the high beam.

The figure shows a situation in which the sub-filament 35*s* of the first lamp portion 33*a* is turned on, but when the aforesaid patterns SA, SB, SC are used together when the main filament 35*m* is turned on, since it can not only enhance the central luminous intensity of the high beam but also complement the side illumination light, it is possible to improve the illumination performance of the high beam.

Thus, in the headlamp 33, for example, switching between the main and sub-filaments in the first lamp portion 33*a* can be controlled through an instruction signal from a manual switch, or a command signal from an automatic lighting device (for example, a device for controlling automatically the turning on and off of the headlamps in response to detection signals from an illumination sensor for detecting the illumination of ambient external light a raindrop sensor, information from a navigation system and operation signals from the wipers) and a beam switching device (a device for automatically switching the high and low beams by detecting the presence of an oncoming vehicle with a photo sensor).

Then, the switching between the main and sub-filaments in the second lamp portion 33*b* can similarly be effected manually or automatically, but the beam emitted from the second lamp portion 33*b* is controlled as an additional beam to the beam emitted from the first lamp portion 33*a*.

That is, the patterns in FIG. 21 provide no concern over blinding the driver of an oncoming vehicle or other users of the road and can improve the visibility with respect to the lane marks and road shoulders when running in the rain, and the patterns are in particular advantageous at the time of changing lanes in a town area where there are many intersections (due to the effectiveness of the near side area irradiating beams). In addition, the use of the remote side area irradiating beams as an additional beam becomes effective when running on bends on a road in a suburban area.

The patterns shown in FIG. 23 can improve the high-speed running safety on a highway equipped with dazzling protective fences when used together with the low beam light distribution pattern. In addition, when used together with the high beam light distribution pattern on a road where there is running no oncoming vehicle, the patterns can help improve the remote forward area illumination performance.

Next, referring to FIGS. 24 to 28, the construction described under ii) above will be described below.

Figure 24:
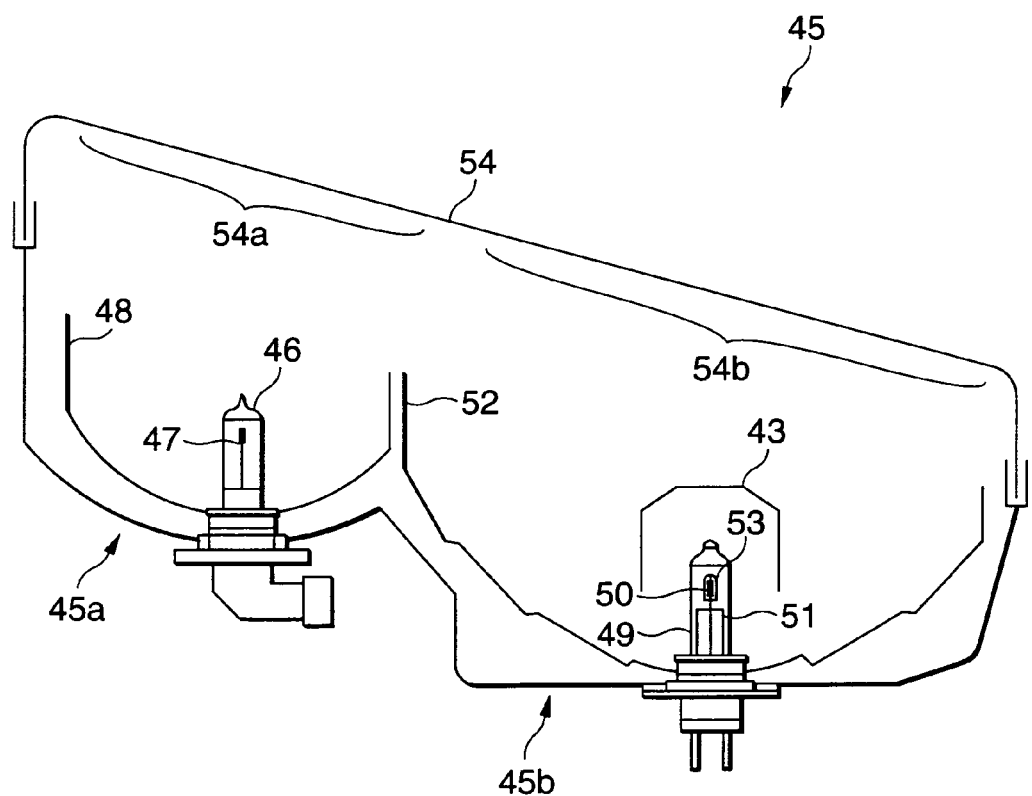
FIG. 24 is a diagrammatic sectional view showing the construction of a headlamp according to another embodiment of the present invention, together with FIGS. 25 to 28, in which the invention is applied to the headlamp.

FIG. 24 is a horizontally sectional view showing the construction of a headlamp 45, which comprises a first lamp portion 45*a* and a second lamp portion 45*b*. Used for a reflector constituting these lamp portions is, for example, a step reflector or the like which is sectioned into a multiplicity of divided areas.

A single-filament incandescent lamp (for example, a bulb of No. 9006 type) 46 is used for a light source constituting the first lamp portion 45*b*, and a filament 47 in the bulb is disposed in a C-8 filament fashion in which the central axis of the filament extends along the optical axis of a reflector 48.

On the other hand, a twin-filament incandescent bulb 49 is used for a light source constituting the second lamp portion 45*b*.

Figure 25:
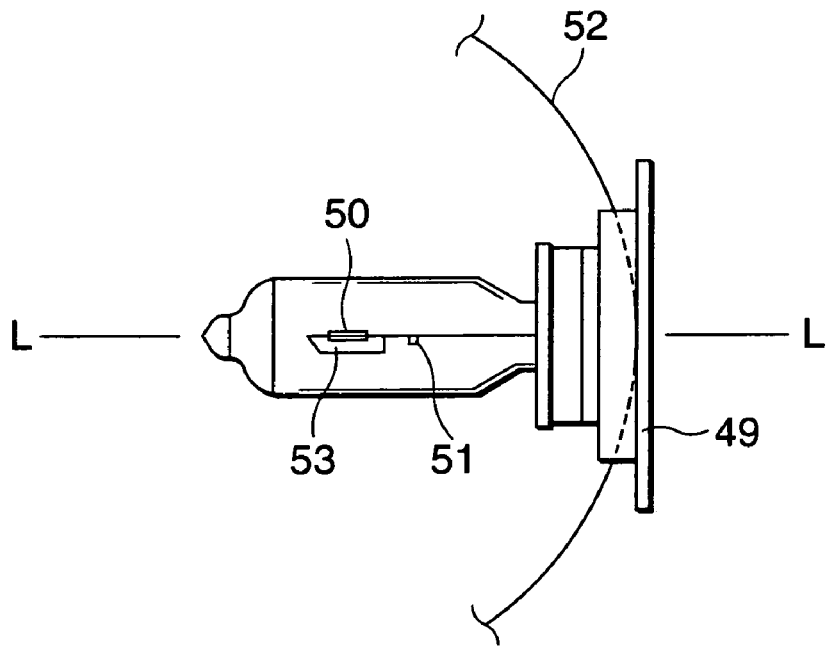
FIG. 25 is a side view showing a bulb.

FIG. 25 shows the construction of a main part of the incandescent bulb 49, and two filaments 50, 51 are disposed as will be described below.

The anterior filament 50 is disposed such that the central axis thereof extends along the optical axis direction (designated by an "L—L" line in the figure) of a reflector 52 (the so-called C-8 disposition) and the filament is accompanied by a shielding member for covering the filament from below.

The posterior filament 51 is disposed such that the central axis thereof intersects with the optical axis L—L at right angles and extends horizontally (the so-called C-6 disposition), and there is provided no shielding member accompanying the filament 51.

Figure 26:
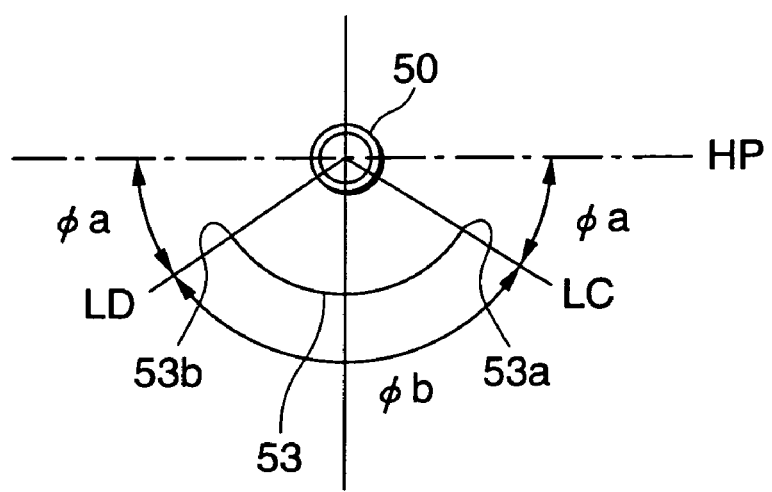
FIG. 26 is an explanatory view for explaining a positional relationship of a shield member relative to a first filament of a second lamp portion.

FIG. 26 is a schematic view of a posture of the shielding member relative to the first filament 50 as viewed from the front side.

End portions (right end 53*a* and left end 53*b*) of the shielding member 53 are situated below a horizontal plane HP (a horizontal plane including the central axis of the filament) designated by an alternate long and short dash line in FIG. 26, and assuming that angles formed between respective half-lines LC, LD extending respectively from the center of the first filament 50 through the respective end portions of the shielding member and the horizontal plane are "Φ a" and that an angle to cover the shielding member 53 from the center of the first filament 50 is "Φb", since a relation of "2·Φa+Φb=180(degrees)" is established, for example, if the shielding range is defined such that Φb=110 (degrees), Φa=35(degrees).

As shown in FIG. 24, a lens member 54 is shared by the respective lamp portions and it has a lens portion 54*a* positioned in front of the reflector 48 constituting the first lamp portion 45*a* and a lens portion 54*b* positioned in front of the reflector 52 constituting the second lamp portion 45*b*. The member 43 shown in the same figure is as described previously.

Figure 27:
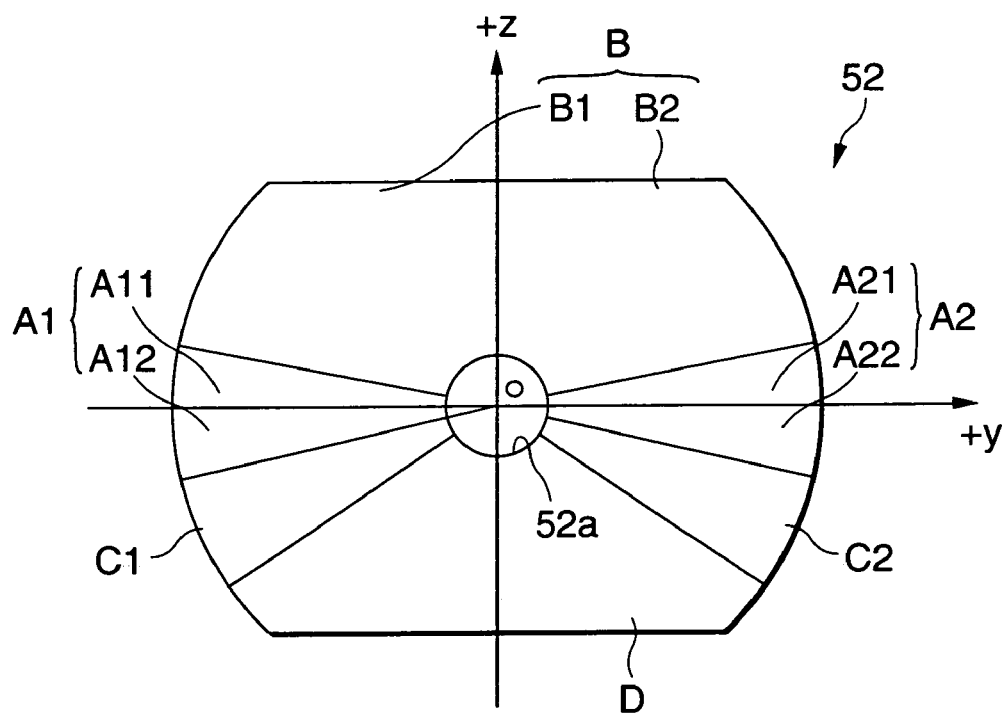
FIG. 27 is an explanatory view for explaining sectioned areas of a reflector according to the second lamp portion.

FIG. 27 shows an example of sectioned areas of the reflector 52 constituting the second lamp portion 45*b* and in setting a three-dimensional rectangular coordinate system, an axis is selected as an x axis which extends in the optical axis direction through the center O of a circular hole 52*a* formed in the center of the reflector 52 for disposition of a light source, a horizontal axis as a y axis and a vertical axis as a z axis, respectively.

As shown in the figure, the reflecting surface is in general sectioned into five areas A1, A2, B, C and D. Further, the areas A1 and A2 comprise, respectively, two areas sectioned by an x-y plane and the areas B, C also comprise two areas, respectively.

The area A1 disposed in the vicinity of the x-y plane on the left-hand side of the x-z plane comprises areas A11 and A12, and one of the two areas, i.e., the area A11 is positioned closely above the x-y plane (in the second quadrant of the y-z plane) and the other area A12 is closely below the x-y plane (in the third quadrant of the y-z plane).

In addition, the area A2 disposed in the vicinity of the x-y plane on the right-hand side of the x-z plane comprises areas A21 and A22, and one of the two areas, i.e., the area A21 is positioned closely above the x-y plane (in the first quadrant of the y-z plane) and the other area A12 is closely below the x-y plane (in the fourth quadrant of the y-z plane).

The area B positioned above the x-y plane is sectioned into two areas B1, B2 by the x-z plane, and the area B1 is positioned on the left-hand side of the x-z plane (in the second quadrant of the y-z plane), whereas the area B2 on the right-hand side of the x-z plane (in the first quadrant of the y-z plane).

The area D is an area positioned below the x-y plane and occupies an angular range corresponding to the shielding range (refer to Φb) for the first filament 50. When the relevant filament is turned on, no light is emitted to this area because the shielding member 53 shields the light trying to enter the area.

The area C comprises areas C1, C2, and the area C1 is positioned between the area A1 and the area D, and the area C2 between the area A2 and the area D. An angular range occupied by the areas C1, C2, A1, A2, B corresponds to an angle which is expressed using the aforesaid angle Φ a as "2·Φa+Φb=180(degrees)."

Upper boundaries of the areas A1, A2, that is, a boundary between the area A11 and the area B1 and a boundary between the area A21 and the area B2, are defined, respectively, by lines of intersection between respective half-planes including the axis x and upwardly inclined relative to the x-y plane and the reflecting surfaces. On the other hand, lower boundaries of the areas A1, A2, that is, a boundary between the area A12 and the area C and a boundary between the area A22 and the area C are defined, respectively, by lines of intersection between respective half-planes including the axis x and downwardly inclined relative to the x-y plane and the reflecting surfaces.

Figure 28:
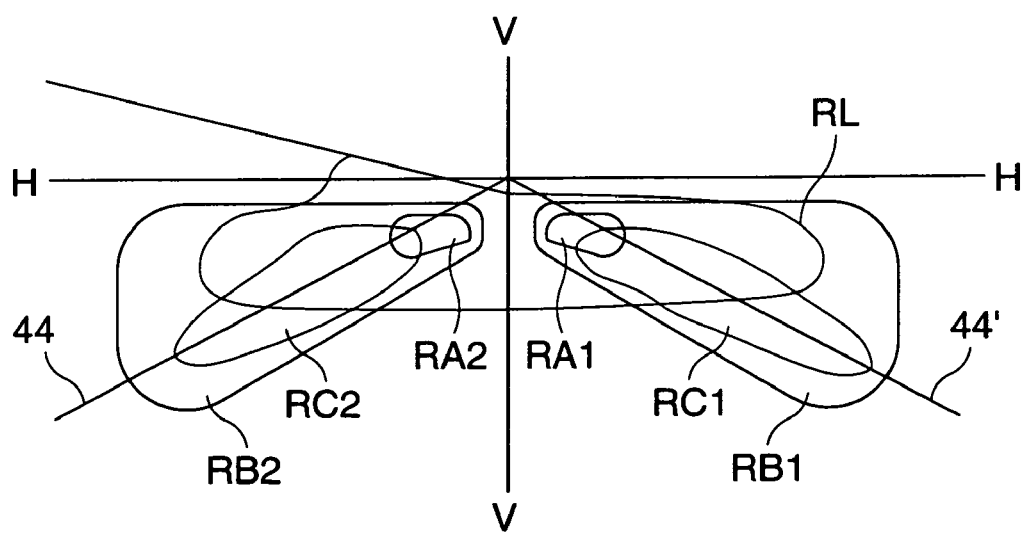

FIG. 28 schematically shows light distribution patterns of light emitted forward from the filament 47 of the first lamp portion 45a and the first filament 50 of the second lamp portion 45b through the respective reflectors 48, 52 and the lens portion 54 when those filament are turned on. The meanings of the "H—H" line, "V—V" line and lines 44, 44' are as described previously.

A pattern RL resulting when the filament 47 of the first lamp portion 45a is turned on is, as shown, a pattern for the low beam and it is identical to the pattern shown in FIGS. 21 and 23.

On the other hand, patterns obtained when the first filament 50 of the second lamp portion 45b is turned on are patterns RA1, RA2 resulting from the areas A1, A2 which contribute to the light distributions for the remote side area irradiating beams, patterns RC1, RC2 resulting from the areas C1, C2 which contribute to the light distributions for the near side area irradiating beams, and patterns RB1, RB2 resulting from the areas B1, B2 which each have such a wide range as to include therein the former two patterns (RA1, RB1 and RC1 are positioned on the right-hand side of the vertical line V—V, whereas RA2, RB2 and RC2 are on the left-hand side of the vertical line V—V).

As described above, the areas A1, A2 are divided into two areas, respectively, and of these divided areas the areas A11, A21 reflect light which is to directly contribute to the ranges of the patterns RA1, RA2, but light reflected by or emitted from the areas A11, A21 can be directed so as to overlap the patterns RA1, RA2, respectively, by controlling the aiming directions of the reflected light using a well known method of adjusting the orientations of vectors in the respective optical axis directions of the small reflecting surfaces constituting the areas A12 and A22 and normal vectors of the base surface.

Similarly, the emitting directions and ranges of the patterns RB1, RB2 can also be controlled to some extent by locally manipulating the optical axes of the small reflecting surfaces constituting the areas B1, B2, respectively, and when this is performed, it is desirable to irradiate lane marks, in particular those provided on each side of one's own lane with a sufficient amount of light.

The patterns RC1, RC2 are mainly intended to illuminate side areas of the lane at the near or intermediate range, and in this case, too, it is desirable to secure a sufficient amount of light for emission onto the shoulder and lane marks on the lane.

When the second filament 51 of the second lamp portion 45b is turned on, since the relevant filament is disposed in the C-6 fashion, in this case, beams (not shown) emitted from the areas A1, A2, B, C are directed slightly upwardly when compared with the respective patterns shown in FIG. 28, and a light distribution is obtained which is slightly diffused to the sides (in the horizontal direction). Then, with the addition of light emission patterns resulting from the area D, a high beam light distribution is eventually realized. Thus, a high beam with better visibility can be obtained when the light distribution so realized is used together with the low beam resulting from the first lamp portion 45a.

In obtaining the light emission patterns shown in FIG. 28, on top of what has been described above, for example, a construction may be used in which a headlamp comprising a combination of three lamp portions is provided at the front portion of the vehicle on left- and right-hand sides thereof, wherein the patterns RA1, RB1, RC1 are formed using the headlamp provided on the right-hand side, whereas the patterns RA2, RB2, RC2 are formed using the headlamp provided on the left-hand side of the vehicle. Thus, various types of modes for carrying out the invention may be conceived depending on how to combine the lamp portions or how to section the area of the reflector.

As is obvious from the description above, since the light distribution and the emission range that have not been satisfactorily secured so far are obtainable by only adding the auxiliary beam to the base beam using the light source that is normally lighted, light distribution capable of assuring the satisfactory visual field angle can be realized according to the travel condition and the travel environment of the vehicle, so that the vehicle travel safety can be improved.

What is claimed is:

1. A vehicular headlamp apparatus comprising:
   (i) a first light-emitting portion that forms a base beam by reflecting light from a first light source;
   (ii) a second light-emitting portion that forms a second light beam by reflecting light from a second light source, a light distribution of the second light beam supplements a light distribution of the base beam; and
   (iii) a light emission control means for varying the light distribution of the second light beam formed by adjusting the light distribution formed by the second light-emitting portion based on travel environment information,
   wherein the light distribution of the base beam is used as a low beam and wherein a light distribution of part of a high beam is used for irradiating a forward field of the vehicle in a wide range and further wherein the second light beam is formed by using a peripheral zone of a reflective surface of a reflector.

2. The vehicular headlamp apparatus as claimed in claim 1, wherein the second light beam is used for irradiating a center line of a roadway or the shoulder thereof.

3. The vehicular headlamp apparatus as claimed in claim 1, wherein the second light beam is emitted to irradiate a field on and near a cutoff that divides the distribution of the low beam into a light and a shade side with a boundary between the light side and the shade side.

4. The vehicular headlamp apparatus as claimed in claim 1, wherein
  (i) the first light source is from at least the low beam and the high beam, and
  (ii) the second light-emitting portion includes a plurality of luminescent portions, whereby an irradiation range is changed by switching the plurality of luminescent portions.

5. The vehicular headlamp apparatus as claimed in claim 1, wherein the second light-emitting portion includes a plurality of luminescent portions, whereby an irradiation range is changed by switching the plurality of luminescent portions.

6. The vehicular headlamp apparatus as claimed in claim 1, wherein the second light-emitting portion includes a luminescent portion having two filaments, and wherein the two filaments are disposed such that a central axis of the filaments extends along an optical axis of the second light-emitting portion.

7. The vehicular headlamp apparatus as claimed in claim 6, wherein one of the filaments irradiates a remote side area irradiation beam and a near side area irradiation beam.

* * * * *